(12) United States Patent
Hermsen et al.

(10) Patent No.: US 9,150,209 B2
(45) Date of Patent: Oct. 6, 2015

(54) SYSTEM AND METHOD FOR MONITORING BRAKING EFFORT

(71) Applicant: General Electric Company, Schenectady, NY (US)

(72) Inventors: Bryan Scott Hermsen, Erie, PA (US); Ajith Kuttannair Kumar, Erie, PA (US); Harry Kirk Matthews, Jr., Niskayuna, NY (US); John Harry Down, Niskayuna, NY (US); Brian Nedward Meyer, Erie, PA (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 13/947,909

(22) Filed: Jul. 22, 2013

(65) Prior Publication Data

US 2015/0025737 A1 Jan. 22, 2015

(51) Int. Cl.
*G01M 17/00* (2006.01)
*G06F 7/00* (2006.01)
*G06F 19/00* (2011.01)
*B60T 17/22* (2006.01)

(52) U.S. Cl.
CPC ..................... *B60T 17/221* (2013.01)

(58) Field of Classification Search
CPC combination set(s) only.
See application file for complete search history.

(56) References Cited

U.S. PATENT DOCUMENTS

| 5,995,881 | A | 11/1999 | Kull | |
|---|---|---|---|---|
| 7,188,341 | B1 | 3/2007 | Haley | |
| 8,311,689 | B2 | 11/2012 | Brand | |
| 2010/0262321 | A1 | 10/2010 | Daum | |
| 2010/0292889 | A1* | 11/2010 | Cahill et al. | 701/31 |
| 2011/0210551 | A1 | 9/2011 | Scholte-Wassink | |
| 2012/0286707 | A1 | 11/2012 | Liberatore | |
| 2013/0192937 | A1* | 8/2013 | Furuyama | 188/72.6 |

* cited by examiner

*Primary Examiner* — Rami Khatib
(74) *Attorney, Agent, or Firm* — GE Global Patent Operation

(57) ABSTRACT

A method (e.g., for monitoring a braking system of a vehicle system) includes monitoring fluid pressures of a braking system and modeled braking efforts of the braking system in a vehicle system traveling along a route, identifying one or more time periods at least one of before a brake event of the braking system or after the brake event, calculating residual forces exerted on the vehicle system during the one or more time periods, and determining at least one of an estimated braking effort of the braking system or an estimated propagation rate at which the estimated braking effort is applied by the braking system using the residual forces that are calculated.

23 Claims, 5 Drawing Sheets

SYSTEM AND METHOD FOR MONITORING BRAKING EFFORT

FIELD

Embodiments of the subject matter described herein relate to monitoring braking effort (e.g., braking forces) applied by brakes of a vehicle system.

BACKGROUND

Some known vehicle systems include braking systems that rely on air pressure to control the braking system. (As used herein, the term "vehicle system" may refer to a single vehicle or multiple vehicles mechanically coupled with each other, such as in a vehicle consist. A vehicle may include a propulsion-generating vehicle capable of self-propulsion or a non-propulsion-generating vehicle that is incapable of self-propulsion.) For example, air brakes are prevented from engaging moving parts of the vehicle systems by maintaining sufficient air pressure in conduits of the braking system that includes the air brakes. In order to activate the air brakes, the pressure is decreased so that the braking system no longer is prevented from engaging the moving components of the vehicle system. The braking system engages the moving components to stop or slow movement of the vehicle system.

Operators of vehicle systems may assume that the vehicle systems can provide a certain amount of braking force (e.g., braking effort) at a given rate (e.g., propagation rate) when the braking systems are activated. Due to inaccurate information used in calculating these forces and/or rates, degradation of the braking system, changes in the route being traveled, and other causes, the actual braking force that is applied may be less and/or the actual braking force may be supplied at a slower rate.

Because operators rely on the expected amounts of braking force that can be supplied and the rate at which the braking force is supplied to be accurate in order to safely operate the vehicle systems, inaccuracies in the braking force and/or rate can result in unsafe operation of the vehicle systems.

BRIEF DESCRIPTION

In an embodiment, a method (e.g., for monitoring a braking system of a vehicle system) includes monitoring fluid pressures of a braking system and modeled braking efforts of the braking system in a vehicle system traveling along a route, identifying one or more time periods at least one of before a brake event of the braking system or after the brake event, calculating residual forces exerted on the vehicle system during the one or more time periods, and determining at least one of an estimated braking effort of the braking system or an estimated propagation rate at which the estimated braking effort is applied by the braking system using the residual forces that are calculated. In one aspect, the time periods during which the residual forces are calculated include steady state time periods. During the steady state time periods, fluid pressure in the braking system and/or modeled braking efforts of the vehicle system do not change by more than one or more respective thresholds for at least a threshold time period.

In an embodiment, a control system (e.g., of a vehicle system) includes a vehicle controller configured to monitor fluid pressures of a braking system and modeled braking efforts of the braking system in a vehicle system traveling along a route. The vehicle controller also is configured to identify one or more time periods at least one of before a brake event of the braking system or after the brake event. The vehicle controller is further configured to calculate residual forces exerted on the vehicle system during the one or more time periods and determine at least one of an estimated braking effort of the braking system or an estimated propagation rate at which the estimated braking effort is applied by the braking system using the residual forces that are calculated. In one aspect, the time periods during which the residual forces are calculated include steady state time periods. During the steady state time periods, fluid pressure in the braking system and/or modeled braking efforts of the vehicle system do not change by more than one or more respective thresholds for at least a threshold time period.

In an embodiment, a method (e.g., for monitoring a braking system) includes measuring air pressures of an air braking system of a vehicle system before and after a brake event representing activation of the air braking system, modeling braking efforts provided by the air braking system before and after the brake event, identifying a pre-brake event time period when both the air pressures do not vary by more than a first threshold amount and the braking efforts that are modeled do not vary by more than a second threshold amount, calculating pre-brake event residual forces exerted on the vehicle system during the pre-brake event steady state time period, and estimating at least one of an actual braking effort of the air braking system or a propagation rate at which the actual braking effort is applied by the air braking system using the residual forces that are calculated.

In an embodiment, the method further comprises generating at least one control signal for controlling the vehicle system, wherein the at least one control signal is generated based on the estimated braking effort of the braking system that is determined and/or on the estimated propagation rate that is determined. For example, the at least one control signal may comprise one or more control signals for revising a trip plan (as explained in more detail elsewhere herein), one or more control signals for displaying information relating to the estimated braking effort and/or the estimated propagation rate to an operator of the vehicle system (which displayed information is of a format and/or content for the operator to act responsive to the information for controlling the vehicle system to a state that is different than its current state), one or more control signals for automatically controlling the vehicle system (e.g., automatically slowing the vehicle system, or automatically stopping the vehicle system), one or more control signals for scheduling a maintenance operation (where the vehicle is controlled according to the schedule for the maintenance operation to be carried out), one or more control signals for adjusting braking system control signals of the vehicle system (e.g., modifying the braking system control signals such that the braking system control signals, for a given control input, control braking of the vehicle system in a different manner than they would have without the one or more control signals having been generated), one or more control signals for adjusting equipment modes of operation of the vehicle system from a current state (mechanical configuration) to a new state (e.g., signals for adjusting vehicle suspension characteristics, such as controlling a motor to tighten or loosen a suspension spring), or the like.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
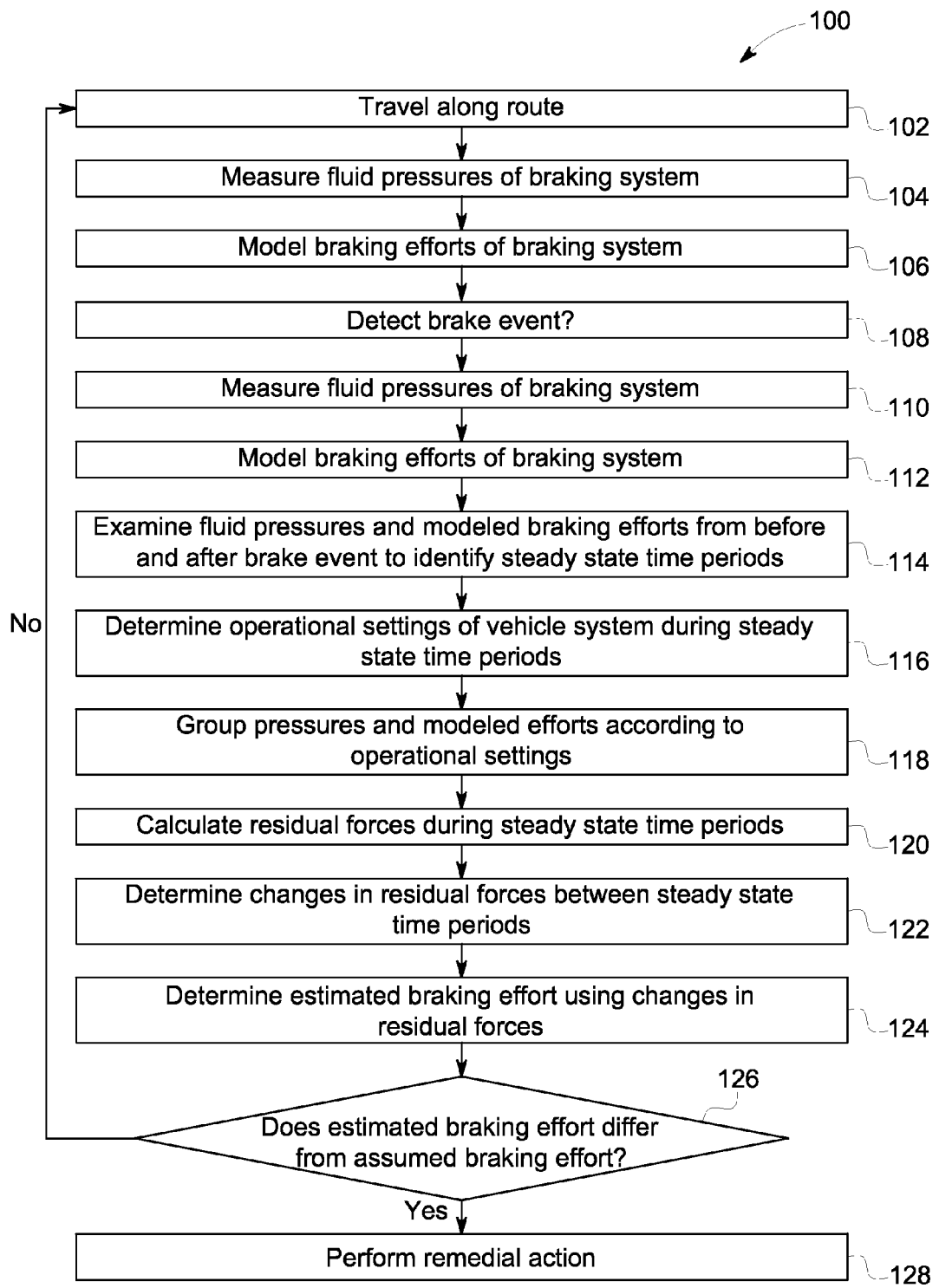
FIG. 1 illustrates a flowchart of a method for monitoring braking effort of a vehicle system.

Embodiments of the inventive subject matter described herein relate to monitoring braking efforts generated by brakes of a vehicle system to stop or slow movement of the vehicle system. Braking efforts can include the resistive forces applied by brakes of the vehicle system that resist movement of the vehicle system. The braking efforts can be provided by air brakes of the vehicle system, such as a braking system that uses fluid pressure (e.g., air pressure) to keep the brakes disengaged and withhold the resistive forces but releases (e.g., reduces) the fluid pressure to engage the brakes and apply the resistive forces.

In one aspect, the fluid pressure of the braking system is monitored, such as by periodically or continuously measuring the fluid pressure held in a fluid reservoir onboard the vehicle system. Optionally, the fluid pressure can be measured in one or more conduits through which the fluid (e.g., air) is conveyed when the fluid pressure in the reservoir is released or reduced. Modeled braking effort provided by the braking system also is monitored, such as by periodically or continuously calculating the effort (e.g., braking force) supplied by the braking system based on one or more measured parameters of the vehicle system. In one aspect, the modeled braking effort is not the force of the brakes that is actually applied, but is a calculated value.

The fluid pressure of the braking system and the modeled braking effort are monitored both before and after a braking event. The braking event can include application of brakes that are controlled using the fluid pressure that is monitored. In one example, a braking event of the braking system is identified by detecting a decrease in the fluid pressure of the braking system by at least a designated, non-zero threshold amount. Optionally, the braking event may be identified by monitoring for automatic or manual actuation of a control device that is used to control application of the braking system.

The fluid pressures in the braking system and the modeled braking effort are examined before and after the braking event to identify one or more time periods occurring before the braking event and one or more time periods following the braking event. The time period(s) identified as occurring before the brake event may be referred to as a pre-brake event time period and the time period(s) identified as occurring after the brake event may be referred to as a post-brake event time period.

These time periods may not include or overlap with the time period during which the braking event is occurring. For example, a time period occurring before the braking event may be identified such that this time period terminates before air brakes of a vehicle system are actuated or otherwise engaged. A time period occurring after the braking event may be identified such that this time period begins after the air brakes of the vehicle system are actuated or otherwise engaged.

The time periods are identified in order to allow for the separation of actual braking force provided by the braking system from common mode errors when the actual braking force is subsequently estimated. As described below, the braking force is estimated from a variety of parameters. During application of the brakes (e.g., during the brake event), one or more other factors other than the actual braking force may impact these parameters. Consequently, estimating the braking force using such parameters can result in the estimated braking force being less accurate than if the parameters are measured during the time periods occurring before and/or after the brake event.

The time periods before and after a brake event may be identified as those windows of time where external forces acting on the vehicle system are known. For example, the time periods may be selected as those times where the drag forces exerted on the vehicle system, gravitational forces exerted on the vehicle system due to a grade of the route, braking forces exerted by another braking system (e.g., dynamic braking), tractive efforts, and the like, have values that are known due to being measured (e.g., by one or more sensors), are known from measurements or calculations performed by previous trips of the vehicle system over the same route, and/or are known due to an operator providing designated values of the forces.

In one aspect, the time periods are referred to as "steady state" time periods. The steady state time periods may be identified by determining the windows of time during which the measured fluid pressures in the braking system and the modeled braking efforts do not vary by more than a designated threshold amount for at least a threshold period of time. The designated threshold amount used for the fluid pressures may be the same or different as the designated threshold amount used for the modeled braking effort.

For example, a steady state time period may be identified for the times when the fluid pressures in the reservoir and when the modeled braking efforts do not increase or decrease by more than 5%, 3%, 1%, or another amount, for at least thirty seconds (or another time period). Optionally, a steady state time period may be identified when the fluid pressures and when the modeled braking efforts do not trend upward or downward. For example, the steady state time periods may be identified as occurring when changes in the fluid pressures and when changes in the modeled braking effort alternate between relatively small increases and decreases, as opposed to increasing or decreasing over all or a substantial (e.g., at least majority) portion of the time period. A trend may be occurring when a best-fit line (e.g., calculated using a least squares regression) to the measured pressures or modeled braking efforts increases or decreases (e.g., has a positive or negative slope).

Optionally, one or more of the time periods may not be a steady state time period. For example, one or more of the time periods may represent a window of time where the fluid pressure and/or modeled braking efforts are significantly changing (e.g., more than a threshold).

The fluid pressures and modeled forces occurring during the time period before the braking event (referred to herein as a pre-braking event time period) may be associated with forces exerted on the vehicle system other than the resistive forces applied by the braking system. For example, during this pre-braking event time period, the forces exerted on the vehicle system may include tractive effort (e.g., propulsive forces that propel the vehicle system along a route), drag forces, braking forces from another braking system (e.g., dynamic brakes), and the like. These forces do not include the braking effort applied by the braking system that uses the fluid pressure to control application of the braking system.

The fluid pressures and modeled forces occurring during the time period after the braking event (referred to herein as a post-braking event time period) may be associated with forces exerted on the vehicle system that include the resistive forces applied by the braking system. For example, during this post-braking event time period, the braking system may be engaged because the fluid pressure has decreased enough following the braking event to cause the braking system to engage. The fluid pressure may not have yet increased or increased enough to release the braking system. As a result, the total forces exerted on the vehicle system during the post-braking event time period may include the braking effort provided by the braking system, drag forces, braking forces from another braking system, and the like.

The actual forces exerted on the vehicle system during these time periods can be estimated and compared with each other to estimate the braking force supplied by the braking system. The total forces exerted on the vehicle system during the pre-braking event time period can be subtracted or removed from the total forces exerted on the vehicle system during the post-braking event time period to estimate the forces supplied by the braking system. Thus, in one aspect, the fluid pressures and/or modeled braking forces before and after engagement of the braking system may be used to identify time periods to be used to estimate the forces exerted on the vehicle system. These estimated forces may then be used to derive an estimated braking effort supplied by the braking system.

As described herein, the braking effort that is estimated may be used to control future operations of the vehicle system, such as to warn an operator of smaller or larger braking forces that is expected or planned for. In one aspect, the vehicle system may be automatically or manually controlled using operational settings designated by a trip plan. If the braking effort that is estimated is different from an input braking effort that is assumed or expected and used to create the trip plan, the trip plan may be modified during travel of the vehicle system to account for the actual braking effort being different from the expected braking effort.

At least one technical effect of embodiments described herein includes improved estimation of the actual braking efforts and rates at which the actual braking efforts are applied during travel of a vehicle system. Knowing this information can allow for the operator to control the vehicle system in a safer manner than not knowing this information. Additionally, these estimates can be used to determine whether to revise the trip plan and/or schedules of the vehicle system and/or one or more other vehicle systems to avoid unsafe operation of a vehicle system having decreased braking efforts and/or a slower than expected application rate of the braking efforts.

Embodiments have been illustrated herein as including monitoring modeled braking efforts of a braking system. However, such embodiments are applicable to monitoring braking efforts more generally, e.g., monitoring sensed braking efforts. Thus, in an embodiment for example, a method comprises monitoring fluid pressures of a braking system and braking efforts of the braking system in a vehicle system traveling along a route, identifying one or more time periods at least one of before a brake event of the braking system or after the brake event, calculating residual forces exerted on the vehicle system during the one or more time periods, and determining at least one of an estimated braking effort of the braking system or an estimated propagation rate at which the estimated braking effort is applied by the braking system using the residual forces that are calculated.

Optionally, the braking efforts that are modeled may be resistive forces imparted on the vehicle system that slow or stop movement of the system. These resistive forces may be calculated based on a model (e.g., similar to the modeled braking efforts), equations, prior trips of the vehicle system, or the like, and represent the forces that are calculated (e.g., not measured) and/or that are measured as being imparted on the vehicle system against the propulsive forces of the vehicle system. The resistive forces may include braking efforts (e.g., modeled or actually applied), drag forces, friction between the moving components of the vehicle system, and the like. The references herein to modeled braking efforts may also or alternatively refer to such resistive forces.

FIG. 1 illustrates a flowchart of a method 100 for monitoring braking effort of a vehicle system. The method 100 may represent or be used to create a software-based system to perform the operations described herein. The operations described and illustrated in FIG. 1 may be performed in the order shown, or may be performed in another, different order. Moreover, the method 100 may be performed in conjunction with the method 500 shown in FIG. 5 and described below.

At 102, a vehicle system travels along a route toward one or more destination locations. The vehicle system may be automatically or manually controlled according to a trip plan. The trip plan designates operational settings of the vehicle system as a function of one or more of time and/or distance along the route in the trip. These operational settings may include one or more of throttle settings, brake settings, speeds, accelerations, tractive efforts, braking efforts, or the like. The trip plan may be created using input data representative of the vehicle system, the route to be traveled along during the trip, and/or the trip. For example, a size of the vehicle system (e.g., mass, weight, and/or length), grades of the route, curvatures of the route, scheduled times at which the vehicle system is to arrive or pass one or more locations, routes to be traveled, and the like, may be used to create the trip plan. A braking effort that can be provided by a braking system, such as an air brake system, of the vehicle system may be used to create the trip plan. This braking effort may be an assumed or calculated braking effort, such as a braking effort derived from a physics-based model of the vehicle system. Optionally, the braking effort may be based on previously measured or estimated braking efforts of the vehicle system. In one aspect, the braking effort used to create the trip plan is not based on any measured fluid pressures of a fluid reservoir in the vehicle system that is used to control activation of a braking system.

The trip plan may be created to reduce at least one of fuel consumed and/or emissions generated by the vehicle system, while causing the vehicle system to arrive at one or more locations within designated time periods (e.g., according to a schedule). The fuel consumed and/or emissions generated by the vehicle may be reduced relative to the vehicle system not traveling according to the trip plan, such as by the vehicle system traveling along the same route to the same locations, but by traveling at the speed limits of the route (e.g., track speed).

The trip plan may be used to automatically control operations of the vehicle system to correspond to the designated operational settings of the trip plan. Optionally, the trip plan may be used to direct an operator to manually control operations of the vehicle system to correspond to the designated operational settings of the trip plan. In one aspect, the vehicle system may not travel according to a trip plan. For example, the vehicle system may be manually controlled without reference to or use of a trip plan.

At 104, fluid pressures of the braking system of the vehicle system are measured. The fluid pressures may be measured in a fluid reservoir of the braking system, such as in an air reservoir that supplies air pressure along a length of a train to prevent air brakes of the train to be actuated. Optionally, the fluid pressures may be measured in another location of the braking system.

The fluid pressures may be measured on a periodic, non-periodic, continual, or other basis. The fluid pressures may be frequently measured, such as once every second (or another frequency). In one example, the fluid pressures are periodically measured during all or a significant portion of the trip of the vehicle system. A window of fluid pressures may be maintained or recorded, such as by saving the previous two, four, or six minutes (or other time period) of pressure measurements in a tangible and non-transitory memory device (e.g., computer accessible and readable memory).

At 106, modeled braking efforts of the vehicle system are calculated. The modeled braking efforts may be calculated concurrently with (e.g., during the same time period as) measurement of the fluid pressures of the braking system. The modeled braking efforts may represent the forces that are expected to be provided by the braking system based on one or more input values representative of characteristics of the vehicle system and/or route. The modeled braking efforts may be different from the braking efforts that actually are applied by the braking system due to other factors that are not included in the equations or model of the braking system used to derive the modeled braking efforts and/or due to errors or inaccuracies of the data that is input into the equations or model.

One example of a model of the braking efforts is one that uses vehicle-specific information and parameters, and a combination of physical mechanism equations and some heuristic relationships, in order to simulate a brake signal propagation delay (e.g., air pressure propagation) down one or more conduits of the braking system, a resulting normal force applied by the brake system based on a commanded brake pressure, fluid reservoir volumes, valve types and the various quick service and response boost valve mechanisms of the braking system, empty load device responses (e.g., how quickly devices respond to application of the braking system), the resulting retarding tractive effort based on a specified braking force manufacturing requirements, and the like.

In one aspect, multiple model hypothesis testing is used to model the braking efforts of the vehicle system. In another aspect, the braking efforts may be modeled using the following equation:

$$F_{brake} = m*a - TE_{(n,v)} + F_{drag}(v) + m*g \quad \text{(Equation \#1)}$$

where $F_{brake}$ represents the modeled braking efforts, $TE_{(n,v)}$ represents the tractive efforts (e.g., propulsive forces that propel the vehicle system along the route) as a function of notch position (n) and velocity (v), $F_{drag}(v)$ represents drag forces exerted on the vehicle system expressed as a function of speed (v) of the vehicle system, a represents the acceleration or deceleration of the vehicle system, m represents the mass of the vehicle system, and g represents gravitational forces exerted on the vehicle system.

In one aspect, the modeled braking efforts may be calculated using a relationship between an expected adhesion between the wheels of the vehicle system and the route and the mass (or weight) of the vehicle system. For example, one or more simulations of movement of the vehicle system may be performed and the braking efforts provided by the braking system estimated or calculated from the simulations. These simulated braking efforts may be used to derive one or more equations (e.g., differential, quadratic, linear, and/or other equations) that attempt to mathematically describe how the simulated braking efforts change during travel of the vehicle system. These equations can represent a model of the movement of the vehicle system, and can be used to model the braking efforts provided by the vehicle system during movement of the vehicle system.

At 108, a determination is made as to whether a brake event has occurred. The brake event can represent application of the braking system associated with the fluid pressures that are measured. For example, the brake event can be actuation of air brakes of the vehicle system. The brake event can be detected by determining when the fluid pressures of the braking system decrease by at least a threshold amount. In one aspect, the actuation of air brakes is detected as occurring when the air pressure in the reservoir of the air brakes decreases by at least two pounds per square inch or another threshold amount. Optionally, the brake event can be detected by monitoring an actuator such as a switch, lever, button, pedal, or other actuator used to control the braking system and determining when the actuator is controlled to engage the braking system.

If a brake event is detected, then the fluid pressures may be rapidly changing (e.g., decreasing) due to release of the fluid pressure in order to cause the brakes to be engaged. Additionally, the modeled braking efforts may change (e.g., increase) due to the braking system being activated. As a result, the actual braking effort provided by the braking system and/or the rate at which the actual braking effort is changing (referred to herein as a propagation rate) may be able to be measured and flow of the method 100 proceeds to 110. On the other hand, if no brake event is detected, then the fluid pressures and/or modeled braking efforts may not be changing due to the release of the fluid pressure. As a result, the actual braking effort and/or propagation rate may not be able to be measured and flow of the method 100 can return to 104, where the fluid pressures continue to be measured and/or the modeled braking efforts continue to be calculated until a brake event is detected.

At 110, additional fluid pressures of the braking system are measured after the brake event. Consequently, the fluid pressures are measured both before and after the brake event.

In one aspect, the fluid pressures may be measured throughout the trip of the vehicle system. The fluid pressures may be at least temporarily stored on a memory device, such as a computer hard drive or other tangible and non-transitory computer readable storage medium. When a brake event is detected, the method 100 may examine the fluid pressures stored in the memory and that were measured for a first designated time period (e.g., two minutes or another time period) before the detected brake event and examine the fluid pressures that were measured and/or are to be measured following the detected brake event for another designated time period (e.g., a second designated time period such as four minutes or another time period, such as two minutes). If no brake event is detected within the first designated time period, then the older fluid pressures that were measured prior to the first designated time period beginning may be discarded (e.g., erased). Optionally, the vehicle system may measure and store the fluid pressures over a longer time period or the entire trip of the vehicle system without discarding any of the fluid pressures.

At 112, additional modeled braking efforts of the vehicle system are calculated so that the modeled braking efforts are determined both before and after the brake event. The modeled braking efforts may not be determined until the brake event is detected. For example, the method 100 may not model any braking efforts before or after the brake event unless and until the brake event is detected. Optionally, the method 100 may model and store the braking efforts as the vehicle system travels, regardless of whether a brake event is detected. The method 100 may then examine the braking efforts modeled before and/or after the brake event during designated time periods (e.g., two minutes before and/or four minutes after the brake event, or other time periods) responsive to the brake event being detected.

Figure 2:
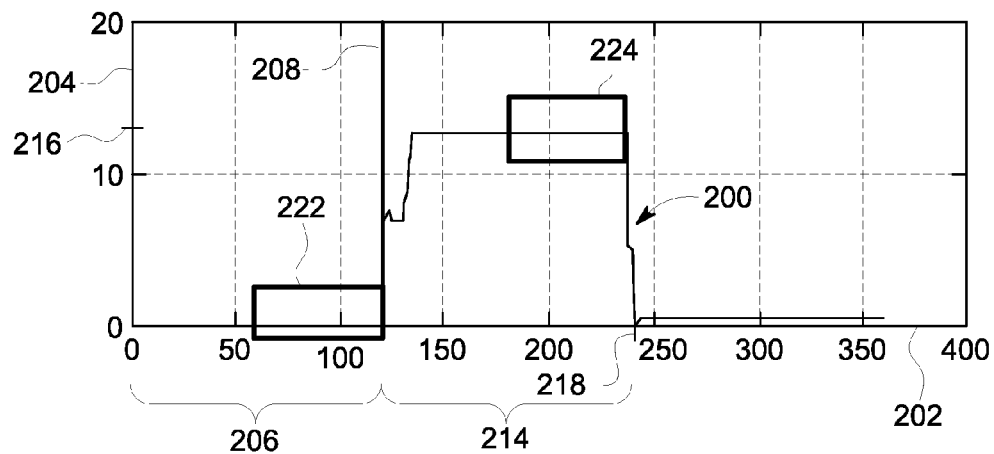
FIG. 2 illustrates an example of fluid pressures measured for a braking system of a vehicle system before, during, and after a brake event.

FIG. 2 illustrates an example of fluid pressures 200 measured for a braking system of a vehicle system before, during, and after a brake event. The fluid pressures 200 are shown alongside a horizontal axis 202 representative of time and a vertical axis 204 representative of a magnitude of the fluid pressures 200. The fluid pressures 200 represent the pressures measured before, during, and after a brake event, such as release of the air from the air braking system that causes the air brakes to be engaged. The fluid pressures 200 are shown as increasing when the brake event occurs, as opposed to decreasing when the brake event occurs. For example, the fluid pressures 200 may represent the pressure of the air flowing through the conduits of the braking system to release the air brakes of a vehicle system. Conversely, the vertical axis 204 may represent decreasing pressures in the reservoir of the braking system. For example, the intersection between the vertical axis 204 and the horizontal axis 202 may represent a larger pressure in the reservoir of the braking system than at points along the vertical axis 204 that are farther from this intersection.

A pre-brake event time period 206 represents a window of time occurring before the brakes are engaged (e.g., before the brake event). A brake event time 208 represents the time at which the brakes are actuated. For example, the brake event time 208 can represent the time at which an operator manually activated the brakes to stop or slow movement of the vehicle system and/or the time at which the brakes were automatically activated to slow or stop movement of the vehicle.

A brake event detection time 210 represents the time at which the brake event is detected. The brake event may be detected when the fluid pressures 200 that are measured change (e.g., decrease or increase) by a threshold amount. For example, when the fluid pressures 200 change by at least two pounds per square inch (or another amount), then the brake event is detected and the brake event detection time 210 is determined to occur.

A post-brake event time period 214 represents a window of time occurring following the brake event. During the post-brake event time period 214, the fluid pressures 200 change to an application pressure 216. The fluid pressures 200 decrease due to release of the fluid from the reservoir to engage the brakes. The application pressure 216 represents the fluid pressure 200 in the braking system (e.g., in the reservoir) after the brakes are engaged and before the fluid pressure 200 in the braking system is increased to release the brakes.

The post-brake event time period 214 ends at a brake release time 218. The brake release time 218 represents when the fluid pressure 200 in the braking system begins to change, such as by a compressor, pump, or other device increasing the amount of fluid in the braking system. As the fluid pressure 200 increases to a sufficiently large pressure, the brakes may become disengaged (e.g., from the wheels or other components of the vehicle system) such that the vehicle system can resume movement.

Figure 3:
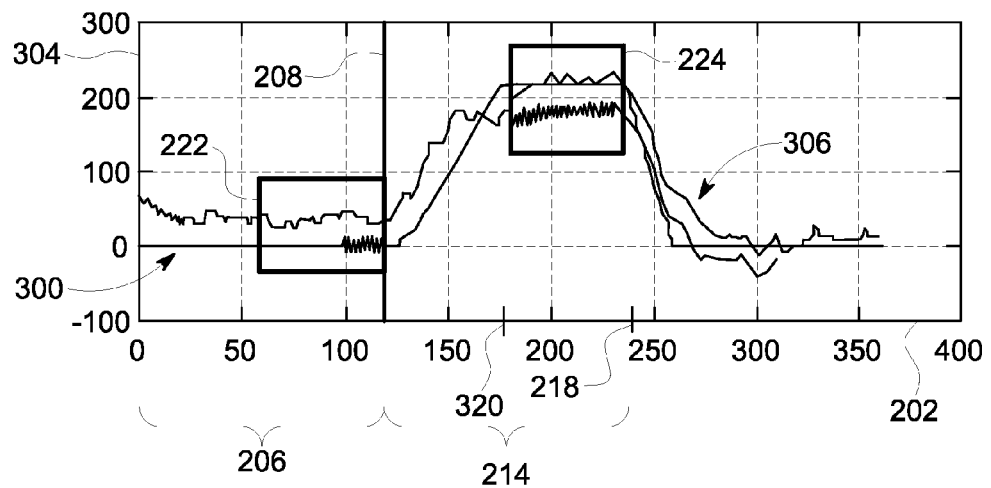
FIG. 3 illustrates an example of modeled braking efforts that are calculated for the vehicle system having the braking system whose fluid pressures are shown in FIG. 2 before, during, and after a brake event.

FIG. 3 illustrates an example of modeled braking efforts 300 that are calculated for the vehicle system having the braking system whose fluid pressures 200 are shown in FIG. 2 before, during, and after a brake event. The modeled braking efforts 300 are shown alongside the horizontal axis 202 representative of time and a vertical axis 304 representative of a magnitude of the modeled efforts 300. The modeled braking efforts 300 represent the forces that are expected to be provided by the braking system according to one or more models before, during, and after the brake event.

Because the braking efforts 300 are modeled based on designated inputs and because the actual values of these inputs may differ from the values used in the model to calculate the modeled braking efforts 300, the actual braking efforts provided by the vehicle system may differ from the modeled braking efforts 300. For example, the model used to calculate the modeled braking efforts 300 may be based on an assumed (e.g., input) reservoir pressure, weight of the vehicle system, grade of the route, curvature of the route, and/or other variables. If the actual values of these variables differ from the assumed values, then the modeled braking efforts 300 may not accurately reflect the actual braking efforts supplied by the braking system. For example, if the actual weight of the vehicle system is greater than the assumed weight that is input into the model, the actual braking efforts may be greater than the modeled braking efforts. Conversely, if the actual weight of the vehicle system is lighter than the assumed weight that is input into the model, the actual braking efforts may be less than the modeled braking efforts. If the actual grade of the route is less than the assumed grade that is input into the model, the actual braking efforts may be less than the modeled braking efforts. On the other hand, if the actual grade of the route is steeper than the assumed grade that is input into the model, the actual braking efforts may be greater than the modeled braking efforts. Additionally or alternatively, one or more other factors that are not considered by the model may cause the actual braking efforts to differ from the modeled braking efforts. For example, a degraded braking system, higher than expected friction between components of the vehicle system, and the like, may cause the modeled efforts to be larger than the actual efforts.

As shown in FIG. 3, the modeled braking efforts 300 are relatively small during the pre-brake event time period 206 because the braking system that is modeled is disengaged and not acting to resist movement of the vehicle system. The modeled braking efforts 300 increase following the brake event time 208 due to the braking system being activated at the brake event time 208.

The modeled braking efforts 300 increase within the post-brake event time period 214 and then level off (e.g., stop increasing) at a later time 320. The modeled braking efforts 300 stop increasing because the braking system is engaged at this later time 320 to stop or slow movement of the vehicle system.

At the brake release time 218, the modeled braking efforts 300 begin to decrease because the fluid pressure 200 in the braking system begins to change to release the brakes. As the fluid pressure 200 changes, the brakes may become disengaged (e.g, from the wheels or other components of the vehicle system) such that the vehicle system can resume movement.

Returning to the description of the flowchart of the method 100 shown in FIG. 1, at 114, the fluid pressures 200 of the braking system and the modeled braking efforts 300 that occur before and after the brake event are examined in order to identify steady state time periods. The steady state time periods represent times when the fluid pressures 200 reach a steady state and when the modeled brake efforts 300 reach a steady state. In one aspect, a steady state time period is identified when both the fluid pressures 200 and the modeled braking efforts 300 reach steady state. Optionally, a steady state time period may be identified when at least one, but not necessarily both, of the fluid pressures 200 and the modeled braking efforts 300 reach steady state. Optionally, the time periods that are identified are not steady state time periods. For example, a pre-brake event time period may be identified as a designated time period occurring before the brake event but not including the brake event. A post-brake event time period may be identified as a designated time period occurring after the brake event but not including the brake event.

In the example illustrated in FIGS. 2 and 3, the fluid pressures 200 and the modeled braking efforts 300 in the pre-brake event time period 206 may be examined to identify a first time period 222. In one aspect, the first time period 222 may be identified as a steady state time period during which the fluid pressures 200 do not vary by more than a first designated amount and the modeled braking efforts 300 do not vary by more than a second designated amount. The first time period 222 may be identified by determining the time period prior to the brake event where the fluid pressures 200 do not vary by more than a designated range (e.g., 0.5 pounds per square inch, 3%, or another value or range) for at least a designated amount of time (e.g., thirty seconds or another time period). The first time period 222 may be identified by determining the same time period prior to the brake event where the modeled brake efforts 300 do not vary by more than a designated range (e.g., 5 Newtons, 3%, or another value or range) for at least a designated amount of time (e.g., thirty seconds or another time period). Optionally, the first time period 222 may not be a steady state time period and may represent a time period occurring before the brake event and where the fluid pressures 200 and/or modeled braking efforts 300 vary by more than the designated range.

Similarly, the fluid pressures 200 and the modeled braking efforts 300 in the post-brake event time period 214 may be examined to attempt to identify a second time period 224 where the fluid pressures 200 and/or the modeled braking efforts do not vary by more than one or more respective designated amounts. The designated ranges and/or designated time periods used to identify the second steady state time period 224 may be the same or different from the designated range and/or designated time period used to identify the first time period 222. The designated ranges and/or designated time periods used to identify the time periods 222, 224 for the fluid pressures 200 may be the same or different as the designated ranges and/or designated time periods used to identify the time periods 222, 244 for the modeled brake efforts 300. Alternatively, the second time period 224 may represent a time period following the brake event where the fluid pressures 200 and/or modeled brake efforts 300 vary by more than the designated range.

Optionally, one or more of the time periods 222, 224 may be identified by fitting a best-fit line to data points representative of the measured fluid pressures 200 and/or the modeled brake efforts 300. For example, this line may be fit to the data points using a least squares regression technique or another technique for determining a line or curve to the data points representative of the fluid pressures 200 or modeled brake efforts 300. These lines may be examined to determine if any segments of the lines have a zero or relatively small slope for at least the threshold time period. The time periods over which such segments extend may be identified as the time periods 222, 224.

The time periods 222, 224 can represent time periods when the forces exerted on the vehicle system are relatively steady state or constant, or are not significantly impacted by common mode errors. For example, during the time period immediately following the brake event 208, the braking effort that is actually provided by the braking system may be changing with respect to time. Prior to and after this time period, and when the fluid pressures 200 are relatively constant or steady state, however, the braking effort that actually is provided by the braking system may be relatively constant or steady state. During the pre-brake event time period 222, little to no braking effort may be provided by the braking system. During the post-brake event time period 224, the braking effort provided by the braking system may be at or close to the maximum amount of braking effort that the braking system may be able to actually provide.

At 116, operational settings of the vehicle system that were used to control the vehicle system during the time periods 222, 224 are determined. For example, the throttle settings and/or brake settings may be determined during the time periods 222, 224. The vehicle system may monitor the operational settings as the vehicle system travels, such as by logging or otherwise recording the operational settings used to control movement of the vehicle system in a memory device.

Figure 4:
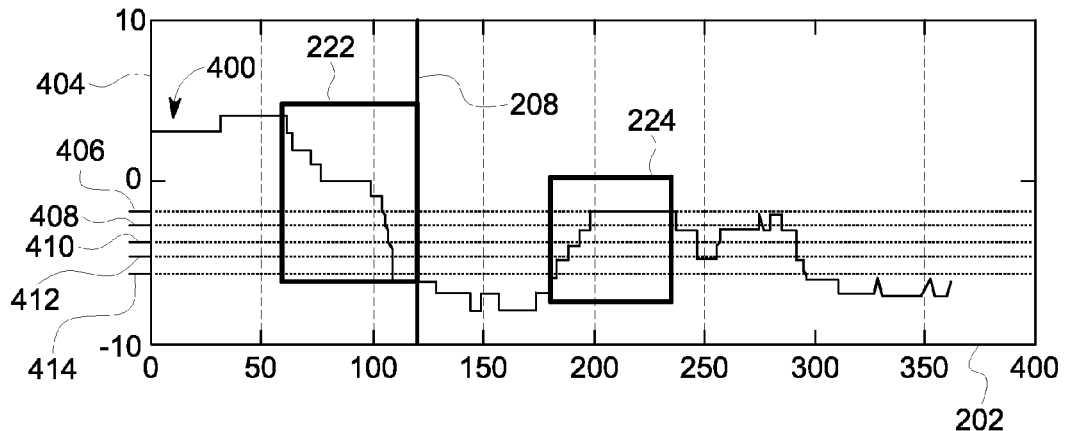
FIG. 4 illustrates an example of operational settings of a vehicle system having the braking system with the fluid pressures shown in FIG. 2 and associated with the modeled braking efforts shown in FIG. 3.

FIG. 4 illustrates an example of operational settings 400 of the vehicle having the braking system having the fluid pressures 200 shown in FIG. 2 and associated with the modeled braking efforts 300 shown in FIG. 3. The operational settings 400 are shown alongside the horizontal axis 202 representative of time and a vertical axis 404 representative of various operational settings. In the illustrated example, the vertical axis 404 represent different notch positions of the vehicle system, with positive notch positions representative of increasing throttle settings that cause the vehicle system to generate corresponding increasing tractive efforts to propel the vehicle system and negative notch positions of increasing brake settings that cause the vehicle system to generate corresponding increasing braking efforts to slow or stop the vehicle system. In one aspect, the negative notch settings represent dynamic brake settings.

Returning to the description of the method 100 shown in FIG. 1, at 118, the measured fluid pressures 200 in the time periods 222, 224 are grouped together (e.g., binned) according to the various operational settings 400 and the modeled brake efforts 300 in the time periods 222, 224 are grouped together according to the various operational settings 400. For example, during the pre-brake event time period 222, the fluid pressures 200 that were measured when a first notch setting of the vehicle system was being used are included in a first group or bin, the fluid pressures 200 that were measured when a different, second notch setting was being used are included in a different, second group, and so on. Similarly, the fluid pressures 200 that were measured using the same notch settings during the post-brake event time period 224 may be grouped into the same group or bin. The modeled brake efforts 300 also may be grouped according to the notch settings in the pre-brake event time period 222 and in the post-brake event time period 224.

At 120, residual forces exerted on the vehicle system are calculated during the time periods 222, 224. The residual forces include those forces that are exerted on the vehicle system other than the known forces being exerted on the vehicle system. As one example, the residual forces may include the tractive effort provided by a propulsion subsystem of the vehicle system (e.g., motors), forces exerted on the vehicle system by the grade of the route and gravitational force, drag forces, the forces caused by the acceleration and mass of the vehicle system. Optionally, the residual forces may include one or more other forces exerted on the vehicle system. The residual forces do not include the braking effort provided by one or more braking systems. For example, the residual forces may not include the braking effort provided by an air brake system of the vehicle system and/or the braking effort provided by a dynamic braking system of the vehicle system.

In one aspect, the residual forces may be determined (e.g., calculated or estimated) from the following relation:

$$F_{residual} = TE_{(n,v)} - F_{effGrade}(x) - F_{drag}(v) - a*m \quad \text{(Equation \#2)}$$

where $F_{residual}$ represents the residual forces exerted on the vehicle system, $TE_{(n,v)}$ represents the tractive efforts (e.g., propulsive forces that propel the vehicle system along the route) as a function of notch position (n) and velocity (v), $F_{effGrade}(x)$ represents the grade (e.g., effective grade or grade that is actually experienced by the vehicle system) expressed as a function of distance or location along the route (x), $F_{drag}(v)$ represents drag forces exerted on the vehicle system expressed as a function of speed (v) of the vehicle system, a represents the acceleration or deceleration of the vehicle system, and m represents the mass of the vehicle system.

With respect to the modeled braking efforts 300 shown in FIG. 3, residual forces 306 of the vehicle system also are shown alongside the horizontal and vertical axes 202, 304. As shown in FIG. 3, the residual forces 306 may be larger than the modeled braking efforts 300 because the residual forces 306 can include additional forces, as described herein.

The residual forces 306 may be calculated for the different groups or bins of operational settings 400 during the time periods 222, 224. For example, for each notch setting (e.g., throttle and/or brake setting) of the vehicle system during the pre-brake event time period 222, an average, median, or other calculation of the residual forces 306 may be determined. The residual forces 306 may be averaged, median, or otherwise calculated as a group for each notch setting of the vehicle system during the post-brake event time period 224.

Optionally, the pressures 200 and/or the modeled brake efforts 300 are not grouped according to the operational settings 400. For example, the residual forces may be calculated for several different operational settings without the pressures 200 and/or modeled brake efforts 300 being binned or otherwise established in groups according to which operational settings were being used.

Returning to the description of the method 100 shown in FIG. 1, at 122, a change in the residual forces 306 between the pre- and post-brake event time periods 222, 224 may be calculated for one or more of the groups of bins of operational settings 400. For example, for each brake notch position and/or each throttle notch position that occurs in both the pre-brake event steady state time period and the post-brake event steady state time period, a difference between the residual forces in the pre-brake event time period 222 and the residual forces in the post-brake event time period 224 may be calculated. In one aspect, the following relation may be used to calculate the change in residual forces 306:

$$\Delta F_{avg}(bin_i) = F_{avg,after,bin_i}(\text{residual}) - F_{avg,before,bn_i}(\text{residual}) \quad \text{(Equation \#3)}$$

where $\Delta F_{avg}(bin)$ represents an average (or median or other calculation) change in the residual forces between the pre- and post-brake event time periods 222, 224 for the $i^{th}$ group or bin of operational settings 400, $F_{avg,after,bin\ i}(\text{residual})$ represents the average, median, or other calculation of residual forces for the ith group or bin of operational settings 400 in the post-brake event time period 224, and $F_{avg,\ before,\ bin\ i}(\text{residual})$ represents the average, median, or other calculation of residual forces 306 for the ith group or bin of operational settings 400 in the pre-brake event time period 222.

In the example of the operational settings 400 shown in FIG. 4, a first difference between the average residual forces 306 calculated for a notch position 406 of negative two during the pre-brake event time period 222 and the average residual forces 306 calculated for the notch position 406 of negative two during the post-brake event time period 224 is calculated, a second difference between the average residual forces 306 calculated for a notch position 408 of negative three during the pre-brake event time period 222 and the average residual forces calculated for the notch position 408 of negative three during the post-brake event time period 224 is calculated, a third difference between the average residual forces calculated for a notch position 410 of negative four during the pre-brake event time period 222 and the average residual forces calculated for the notch position 410 of negative four during the post-brake event time period 224 is calculated, a fourth difference between the average residual forces calculated for a notch position 412 of negative five during the pre-brake event time period 222 and the average residual forces calculated for the notch position 412 of negative five during the post-brake event time period 224 is calculated, and a fifth difference between the average residual forces calculated for a notch position 414 of negative six during the pre-brake event time period 222 and the average residual forces calculated for the notch position 414 of negative six during the post-brake event time period 224 is calculated. Optionally, other differences may be calculated, which may include groupings of operational settings, or which may not consider operational settings.

At 124, an estimated braking effort that is provided by the braking system that is controlled using the fluid pressures 200 is determined (e.g., estimated) using the difference between the residual forces 306. For example, the estimated braking effort may be estimated using the differences between the average residual forces calculated for the various operational settings 400 during the time periods 222, 224.

In one aspect, the estimated braking effort is estimated by determining a weighted average or median of the differences in residual forces 306. For example, the residual force differences calculated for the operational settings 400 occurring in the pre- and post-brake event time periods 222, 224 may be averaged, with greater weight in the calculated average provided to those operational settings 400 used more often than operational settings 400 used less often in the time periods 222, 224.

For example, the estimated braking effort may be calculated using the following relation:

$$\Delta F_{est} = \frac{\sum_i (N_{points_i} * \Delta F_{avg}(bin_i))}{\sum_i N_{points_i}} \quad \text{(Equation \#4)}$$

where $\Delta F_{est}$ represents the estimated braking effort, $N_{points\ i}$ represents the number of times the $i^{th}$ group of operational settings 400 occurred during the pre-brake event time period 222 and/or during the post-brake event time period 224, and $\Delta F_{avg}(bin_i)$ represents the average (or median or other calculation) change in the residual forces between the pre- and post-brake event time periods 222, 224 for the $i^{th}$ group or bin of operational settings 400. Optionally, the estimated braking effort may be calculated as an unweighted average (or median or other calculation) change in the residual forces between the pre- and post-brake event time periods 222, 224.

In one aspect, the estimated braking effort may be determined by calculating a difference between an average, median, or other measure of the residual forces 306 in the pre-brake event time period 222 and an average, median, or other measure of the residual forces 306 in the post-brake event time period 224.

Using the change in the residual forces may allow for more accurate estimation of the braking effort relative to using another measure or calculation of the residual forces because the change cancels out or removes (from the calculation of the braking efforts) constant or unknown forces or errors, such as errors in drag estimation, a constant dynamic braking force that is being applied by the vehicle system, or the like. For example, because these constant or unknown forces or errors are present and equivalent or approximately equivalent in both the pre-brake event time period 222 and the post-brake event time period 224, subtracting the residual forces in the pre-brake event time period 222 from the post-brake event time period 224 can cancel out these constant or unknown forces or errors from the estimation of the braking effort.

In one aspect, a confidence factor may be calculated for the estimated braking efforts. The confidence factor can represent a probability that the estimated braking effort is accurate relative to the actual braking force supplied by the braking system. A larger confidence factor indicates that the estimated braking effort is more likely to be closer or equivalent to the actual braking effort, and a smaller confidence factor indicates that the estimated braking effort is less likely to be close or equivalent to the actual braking effort. The confidence factor can be calculated from a variety of factors that reduce or increase potential sources of error in the estimation of the braking effort. For example, the confidence factor may increase when the time periods 222, 224 represent steady state time periods. Conversely, the confidence factor may decrease when one or both of the time periods 222, 224 are not steady state time periods. The confidence factor can increase when more of the parameters used to calculate the residual forces are known. For example, if the drag forces, tractive efforts, acceleration, and the like, are known (e.g., measured, obtained from a log of a previous trip of the vehicle system over the route, provided from an operator, or the like), then the confidence factor may be larger than if one or more of these parameters are unknown or estimated. The confidence factor may increase if the operational settings of the vehicle system change very little or not at all during the time periods 222, 224, and decrease if these operational settings change a greater amount. For example, the confidence factor may be larger when the throttle settings, dynamic brake settings, and the like, remain constant or change very little during the time periods 222, 224 than if these settings change or change significantly.

At 126, a determination is made as to whether the estimated braking effort differs from an assumed braking effort. The assumed braking effort may be referred to as a planned braking effort. The assumed braking effort represents the amount of braking force that is expected to be provided by the vehicle system. For example, the braking system may be assumed to be able to provide a designated amount of braking force based on the type of braking system, age of the braking system, health of the braking system, size (e.g., length and/or mass) of the vehicle system, and the like. If the estimated braking effort differs from this assumed braking effort by at least a threshold difference, then the braking force that the operator of the vehicle system is expecting to receive from the braking system may be incorrect and continued operation of the vehicle system using the expected braking effort may be unsafe. As a result, flow of the method 100 may proceed to 128.

On the other hand, if the estimated braking effort does not differ from the assumed or expected braking effort by at least the threshold difference, then continued operation of the vehicle system using the assumed braking effort may proceed. As a result, flow of the method 100 may return to 102 so that additional brake events can be detected and examined to estimate the braking effort of the vehicle system. In one aspect, multiple estimates of the braking efforts may be used to update and/or improve the accuracy of the estimated braking effort. For example, a first estimated braking effort may be determined from a first brake event, a second estimated braking effort may be determined from another, second brake event, and so on. These estimated braking efforts may be combined (e.g., averaged or used to calculate a median) in order to create and update the estimated braking effort of the vehicle system.

In one aspect, the vehicle system may be traveling along the route according to operational settings designated by a trip plan. As described above, the trip plan may designate operational settings of the vehicle system as a function of time and/or distance along a route. These operational settings may be designated to cause the vehicle system to apply at least a designated amount of braking effort at a designated time and/or location to cause the vehicle system to travel at one or more designated speeds. If the estimated braking effort is different (e.g., less) than the assumed braking effort on which the trip plan was created or previously revised, then the vehicle system may be unable to supply the braking efforts designated by the trip plan. Accordingly, the vehicle system may be unable to follow the trip plan. The trip plan may need to be revised in order to account for the estimated braking effort being different from the assumed braking effort on which the trip plan is based. As a result, flow of the method 100 may proceed to 128.

At 128, one or more remedial actions are performed in response to the estimated braking effort being different from the assumed braking effort. For example, prior to performing the remedial action, the vehicle system may be operating in a mode that causes the vehicle system to automatically provide a braking advisement notification to the operator of the vehicle system. This notification may direct the operator to manually apply the braking system to ensure that the vehicle system does not travel faster than a designated speed limit of the route or a slow order for a segment of the route. This notification may direct the operator to apply the braking system to prevent the vehicle system from entering into a restricted or prohibited segment of the route.

In response to the determination that the estimated braking effort being different from the assumed braking effort, the vehicle system may prohibit the braking advisement notification from being provided to the operator. The vehicle system may no longer provide such a notification because the braking effort that actually can be provided by the vehicle system may be less than the assumed braking effort on which the notification is based. Consequently, the notification may erroneously be based on an assumption that the vehicle system can provide more braking effort than the vehicle system actually can provide. Once it is determined that the vehicle system cannot provide the assumed braking effort, the vehicle system may stop providing such notifications. Optionally, the vehicle system can continue to provide the notifications, but provide the notifications based on the estimated braking effort sooner than the notifications based on the assumed braking effort.

Optionally, if the vehicle system is traveling according to a trip plan that was created or previously revised based on the assumed braking effort, the trip plan may be revised using the estimated braking effort as a remedial action. For example, if the vehicle system is not able to provide the assumed braking effort, the designated operational settings of the trip plan may be changed to account for the different estimated braking effort that the vehicle system actually can provide. This revising of the trip plan may include directing the vehicle system to activate the braking effort sooner than in the trip plan prior to revision, to travel slower during approaches to locations where the braking system is to be activated (relative to the trip plan prior to revision), and the like.

In one aspect, the remedial action may be notifying the operator that the estimated braking effort differs from the assumed braking effort. For example, a display device may present a visual warning, a speaker device may audibly present a warning, and/or a haptic device may present a warning by vibrating and/or changing a temperature of a device (e.g., a seat, handle, or the like) to warn the operator that the estimated braking effort differs from the assumed braking effort.

Optionally, the remedial action may be communicating a notification of the estimated braking effort being different from the assumed braking effort to one or more off-board locations. As one example, this notification may be transmitted or broadcast to a repair facility (e.g., building) located at an upcoming portion of the route. The notification may be provided so that the repair facility can prepare for the arrival of the vehicle system, such as by scheduling time to inspect and/or repair the braking system, to order parts for the braking system, to arrange for one or more specialized repair persons to travel to the repair facility, or the like.

As another example, the notification can be communicated to a scheduling facility, such as a dispatch center, that coordinates the schedules and/or movements of several vehicle systems on a network of interconnected routes. The notification may be provided to allow for the scheduling facility to determine if the schedules of one or more of the vehicle systems need to be changed to account for the estimated braking effort of the vehicle system. For example, the scheduling facility may direct other vehicle systems to remain farther from the vehicle system having a decreased estimated braking effort to prevent the vehicle systems from coming too close to the vehicle system having the decreased estimated braking effort and risk collision.

Figure 5:
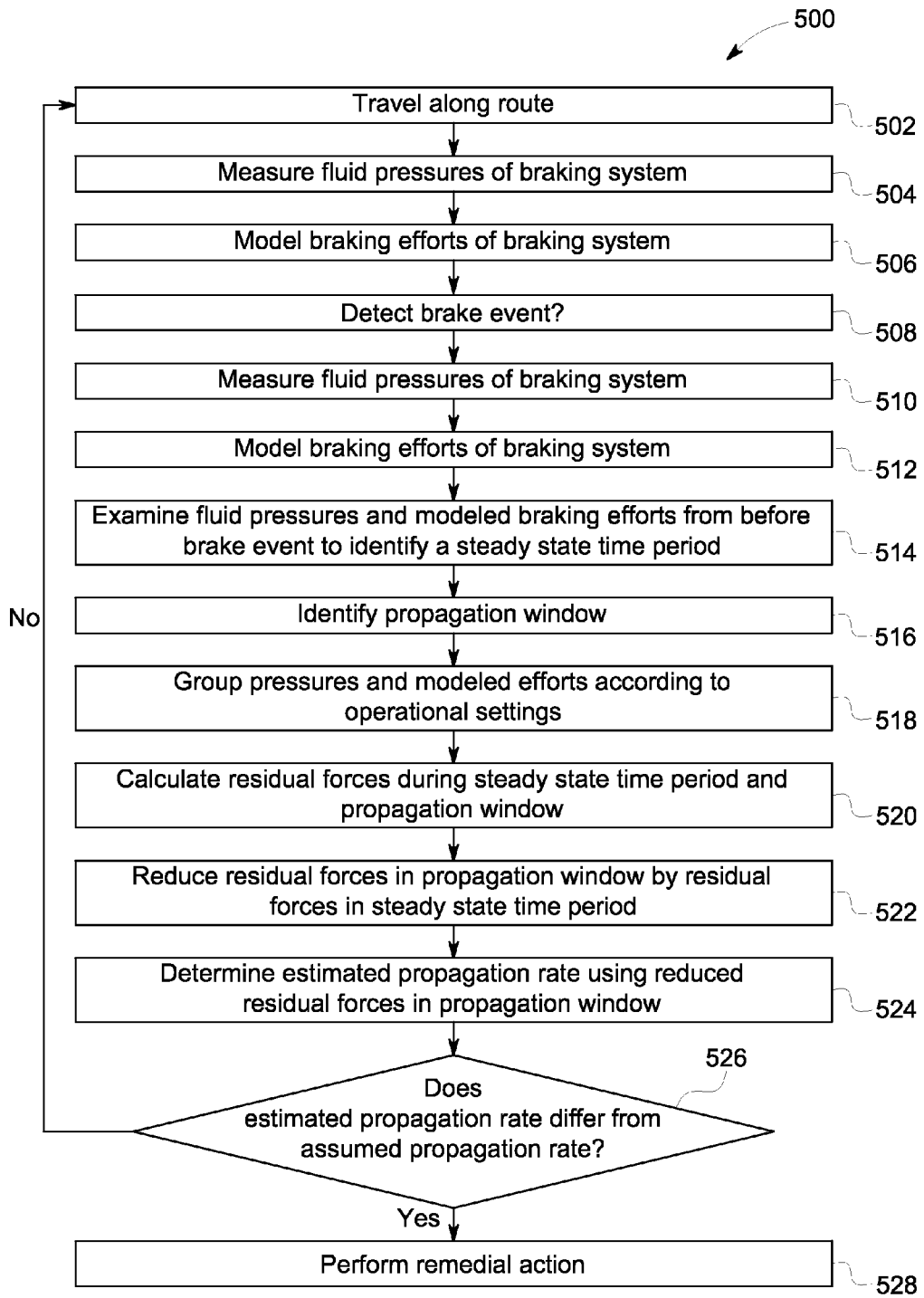
FIG. 5 illustrates a flowchart of a method for monitoring a propagation rate of braking effort provided by a vehicle system.

FIG. 5 illustrates a flowchart of a method 500 for monitoring a propagation rate of braking effort provided by a vehicle system. The method 500 may represent or be used to create a software-based system to perform the operations described herein. The method 100 describes estimating braking effort that is applied by the braking system controlled using the fluid pressures 200. Additionally or alternatively, the method 500 may be used to estimate a propagation rate at which the estimated braking effort is applied by the braking system. The propagation rate represents how quickly the braking effort is applied by the braking system. A braking system associated with a faster propagation rate may apply the estimated braking effort faster than a slower propagation rate. Consequently, faster propagation rates may be associated with braking systems that can slow or stop movement of a vehicle system faster than if the braking systems had slower propagation rates for the same vehicle system.

Estimation of the propagation rate may occur subsequent to, concurrent with, or in place of estimation of the braking effort. For example, the method 100 may proceed by estimating the braking effort and then the method 500 may be used to estimate the propagation rate. Or, the method 100 may be used to estimate the braking effort while the method 500 estimates the propagation rate during time periods that at least partially overlap. Or, the method 100 may be used to estimate the braking effort, but the method 500 is not used to estimate the propagation rate. Or, the method 500 may be used to estimate the propagation rate, but the method 100 may not be used to estimate the braking effort. The methods 100 and 500 may be used to both estimate the braking effort and the propagation rate for the same activation of the braking system.

At 502, a vehicle system travels along a route toward one or more destination locations, similar to as described at 102 in the method 100 shown in FIG. 1.

At 504, fluid pressures of the braking system of the vehicle system are measured, similar to as described above at 104 in the method 100 shown in FIG. 1. The pressures that are measured at 504 may be the same pressures used to estimate the braking effort as described above in connection with the method 100.

At 506, modeled braking efforts of the vehicle system are calculated, similar to as described above at 106 in the method 100 shown in FIG. 1. The braking efforts that are modeled may be the same modeled efforts calculated in the method 100.

At 508, a determination is made as to whether a brake event 608 has occurred, similar to as described above in connection with 108 in the method 100 shown in FIG. 1. The brake event may be the same event as described above in connection with the method 100 shown in FIG. 1. If no brake event has occurred, then flow of the method 500 can return to 502. If a brake event has occurred, then flow of the method 500 may proceed to 510.

At 510, additional fluid pressures of the braking system are measured after the brake event, similar to as described above at 110 in the method 100 shown in FIG. 1. The additional pressures that are measured may be the same pressures measured after the braking event in connection with the method 100.

Figure 6:
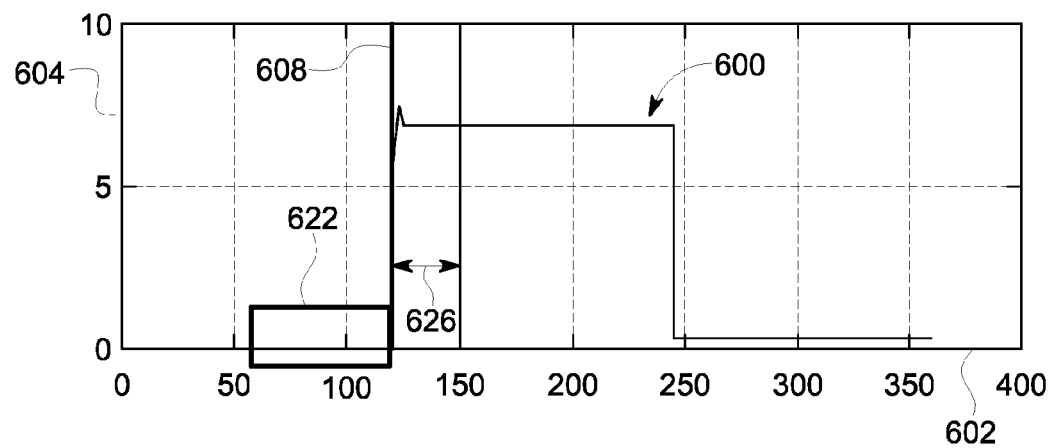
FIG. 6 illustrates another example of fluid pressures measured for a braking system of a vehicle system before, during, and after a brake event.

FIG. 6 illustrates another example of fluid pressures 600 measured for a braking system of a vehicle system before, during, and after a brake event. The fluid pressures 600 may be similar to the fluid pressures 200 shown in FIG. 2. For example, the fluid pressures 600 are shown alongside axes 602, 604 that are similar to the axes 202, 204 shown in FIG. 2.

Returning to the description of the method 500 shown in FIG. 5, at 512, additional modeled braking efforts of the vehicle system are calculated, similar to as described above in connection with 112 in the method 100. As a result, the modeled braking efforts are determined for the time periods before and after the brake event 608.

Figure 7:
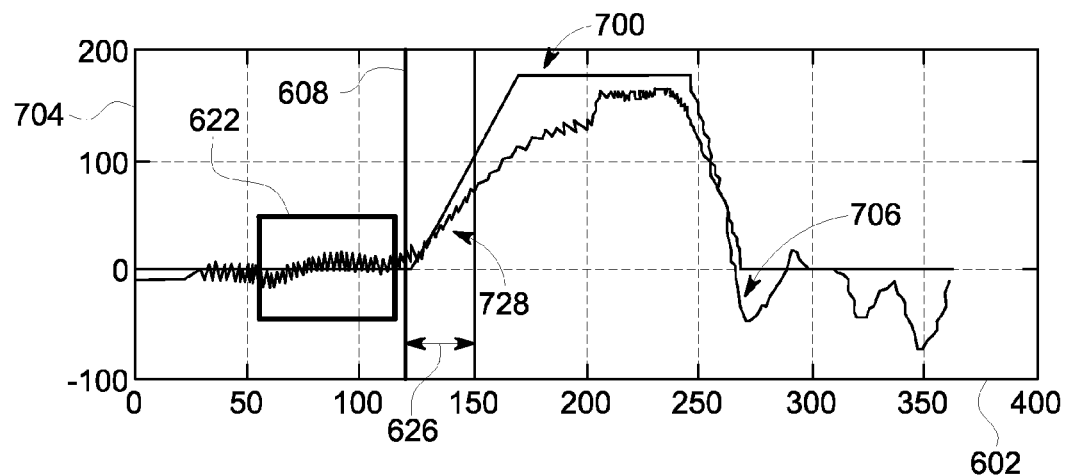
FIG. 7 illustrates an example of modeled braking efforts that are calculated for the vehicle system having the braking system whose fluid pressures are shown in FIG. 6 before, during, and after a brake event.

FIG. 7 illustrates an example of modeled braking efforts 700 that are calculated for the vehicle system having the braking system whose fluid pressures 600 are shown in FIG. 6 before, during, and after a brake event 608. The modeled braking efforts 700 may be similar to the modeled braking efforts 300 shown in FIG. 3, and may be calculated in a similar manner. One difference between calculation of the modeled braking efforts used to estimate the braking effort and the calculation of the modeled braking efforts used to estimate the propagation rate is that the modeled braking efforts for the propagation rate may be multiplied by the time elapsed since the brake event. The modeled braking efforts 700 are shown alongside the horizontal axis 602 and a vertical axis 704 that is similar to the vertical axis 304 shown in FIG. 3.

Figure 8:
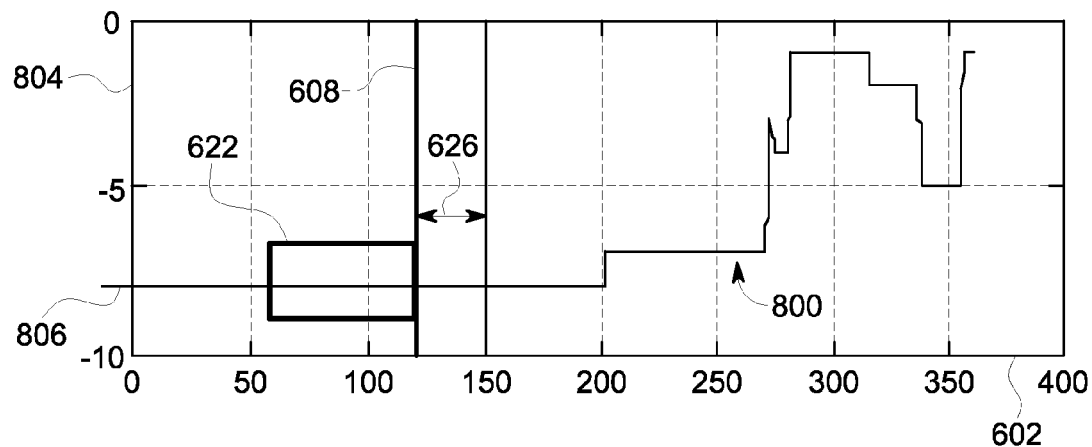
FIG. 8 illustrates an example of operational settings of the vehicle system having the braking system whose fluid pressures are shown in FIG. 6 before, during, and after a brake event.

FIG. 8 illustrates an example of operational settings 800 of the vehicle system having the braking system whose fluid pressures 600 are shown in FIG. 6 before, during, and after a brake event 608. The operational settings 800 may be similar to the operational settings 400 shown in FIG. 4, and may be determined in a similar manner (e.g., by monitoring changes to throttle and/or brake notches). The operational settings 800 are shown alongside the horizontal axis 602 and a vertical axis 804 that is similar to the vertical axis 304 shown in FIG. 3.

Returning to the description of the method 500 shown in FIG. 5, at 514, the fluid pressures 600 of the braking system and the modeled braking efforts 700 that occur before the brake event 608 are examined in order to identify a time period of interest. For example, a pre-brake event steady state time period 622 may be identified in a manner similar to the pre-brake event time period 222 (shown in FIG. 2). If both the braking effort and propagation rate are estimated for the same braking event, then the pre-brake event time period 222 that is identified for estimating the braking effort may be the same time period that is used as the pre-brake event time period 622 used to estimate the propagation rate.

At 516, a propagation window 626 is identified. The propagation window 626 is identified in order to determine which modeled braking efforts can be used to estimate the propagation rate of the braking system.

An example of a propagation window 626 is shown in FIGS. 6 through 8. The propagation window 626 may be identified as a time period following the brake event 608 of the braking system. Optionally, the propagation window 626 may begin after a designated delay following the brake event 608. As another example, the propagation window 626 may be identified by determining the time period over which the modeled braking efforts 700 are increasing and linear or substantially linear following the brake event 608. The brake event 608 represents when the braking system is activated, similar to the brake event 208 shown in FIG. 2.

In one aspect, the propagation window 626 extends over at least a portion of the time during which the modeled braking efforts 700 are linear or substantially linear (e.g., more linear than curved) following the brake event 608. The propagation window 626 can be identified as a designated amount of time following the brake event 608 where the operational settings 800 of the vehicle system remain the same (e.g., do not change) or vary by a relatively small amount (e.g., less than a designated threshold).

The propagation window 626 can be identified as the designated time period that begins at the brake event 608 and ends thirty seconds (or another length of time) following the brake event 608. Optionally, the propagation window 626 can be identified as a designated distance traveled by the vehicle system. If the operational settings 800 change during this designated time period, then the propagation window 626 is not identified. For example, if the throttle setting and/or brake setting change during the designated time period following the brake event 608, then any propagation rate that is estimated from data within the propagation window 626 may incorrectly reflect the actual propagation rate because the changing operational settings may alter the propagation rate. Accordingly, if the throttle and/or brake settings change within the designated time period following the brake event 608, then no propagation window 626 is identified and the propagation rate may not be estimated from this application of the braking system. In one aspect, operation of the method 500 may then terminate with respect to estimating the propagation rate for this application of the braking system. Alternatively, the propagation window 626 may be identified even when the throttle and/or brake settings change within this designated time period.

With respect to the example of the operational settings 800 shown in FIG. 8, the propagation window 626 may be found to exist only where the operational settings 800 do not change during the propagation window 626 in one embodiment. For example, the operational settings 800 shown in FIG. 8 remain at a notch setting 806 of negative seven over the time period (e.g., thirty seconds) following the application time 620. Because the operational settings 800 do not change over this time period, then the propagation window 626 may be identified during this time period. If the operational settings 800 did change during this time period, then the propagation window 626 may not be identified. For example, if the operational settings 800 changed from negative seven to another value (e.g., negative six or negative eight) during this time period following the brake event 608, then the modeled braking efforts 700 associated with this application of the braking system may not be used to determine the propagation rate. Optionally, the propagation window 626 may be identified and a propagation rate may be determined even if the operational settings 700 change during the designated time period following the brake event 608.

At 518, the measured fluid pressures 600 in the pre-brake event time period 622 are grouped together (e.g., binned) according to the operational settings 400 and the modeled brake efforts 700 in the pre-brake event time period 622 are grouped together according to the operational settings 400. For example, the fluid pressures 600 and modeled brake efforts 700 may be binned together according to the operational settings 800 that temporally correspond with the pressures 600 and efforts 700, similar to as described above in connection with 118 in the method 100.

At 520, one or more residual forces exerted on the vehicle system are calculated. The residual forces can be calculated for time period during the pre-brake event time period 622 and the time period during the propagation window 626. If the residual forces were calculated for the pre-brake event time period 622 in order to estimate the braking effort (e.g., as described above in connection with the method 100 shown in FIG. 1), then those residual forces may be used for the pre-brake event time period 622 to estimate the propagation rate.

As described above, the residual forces include those forces that are exerted on the vehicle system other than the known forces being exerted on the vehicle system. The residual forces may be calculated for the pre-brake time period 622 in a manner similar to those described above in connection with 120 of the method 100.

With respect to the modeled braking efforts 700 shown in FIG. 7, residual forces 706 of the vehicle system also are shown alongside the horizontal and vertical axes 602, 704. As shown in FIG. 7, the residual forces 706 exhibit an approximately linear or substantially linear shape throughout at least a portion of the propagation window 626.

The residual forces 706 may be calculated for the different groups or bins of operational settings 800 during the pre-brake time period 622. For example, for each notch setting (e.g., throttle and/or brake setting) of the vehicle system during the pre-brake event time period 622, an average, median, or other calculation of the residual forces 706 may be determined. Alternatively, the residual forces 706 may be calculated without grouping or binning the operational settings. For example, the residual forces 706 may be calculated for the pre-brake event time period 622 even though several different operational settings are used during this time period 622.

At 522, the residual forces 706 calculated for the propagation window 626 are reduced by the residual forces 706 calculated for the pre-brake event time period 622. For example, the residual force calculated for the pre-brake event time period 622 (or an average, median, or other statistical measure of the residual forces in the time period 622) may be subtracted from each or several of the residual forces 706 occurring during the propagation window 626.

In the example of the modeled brake efforts 700 and residual forces 706 shown in FIG. 7, the residual forces 706 calculated during the pre-brake event time period 622 are relatively small and, as a result, the reduction in the residual forces 706 in the propagation window 626 is relatively small. Consequently; the residual forces 706 in the propagation window 626 are reduced very little, if at all. In another example, the residual forces 706 in the propagation window 626 may be reduced by a larger amount.

At 524, an estimated propagation rate of the braking system is determined (e.g., estimated) using the residual forces 706 that are reduced within the propagation window 626. The estimated propagation rate may be determined by identifying the rate at which these reduced residual forces change within the propagation window. In one aspect, a line 728 is fit (e.g., using least squares regression or another line-fitting technique) to the residual forces 706 in the propagation window 626 that are reduced by the residual forces 706 from the pre-brake event time period 622. The slope of this line 728 may be measured as one estimate of the propagation rate.

At 526, a determination is made as to whether the estimated propagation rate differs from an assumed propagation rate. The assumed propagation rate may be referred to as a planned propagation rate. The assumed propagation rate represents how quickly the braking force that is expected or estimated to be provided by the vehicle system is applied to slow or stop movement of the vehicle system. For example, the braking system may be assumed to be able to provide the assumed or estimated braking force at an assumed rate that is based on the type of braking system, age of the braking system, health of the braking system, size (e.g., length and/or mass) of the vehicle system, and the like. If the estimated propagation rate differs from the assumed propagation rate by at least a threshold difference, then the speed at which the vehicle system is able to supply the braking force may be different from the speed at which the operator and/or trip plan expects for the vehicle system to apply the braking force. As a result, flow of the method 500 may proceed to 528.

On the other hand, if the estimated propagation rate does not differ from the assumed or expected propagation rate by at least the threshold difference, then continued operation of the vehicle system using the assumed propagation rate may proceed. As a result, flow of the method 500 may proceed to 530.

In one aspect, the vehicle system may be traveling along the route according to operational settings designated by a trip plan. These operational settings may be designated to cause the vehicle system to apply a designated amount of braking effort at a designated rate or speed when the vehicle system reaches a designated time and/or location to cause the vehicle system to travel at one or more designated speeds. If the estimated propagation rate is different (e.g., slower) than the assumed propagation rate on which the trip plan was created or previously revised, then the vehicle system may be unable to stop or slow the vehicle system sufficiently fast as required by the trip plan. Accordingly, the vehicle system may be unable to follow the trip plan. The trip plan may need to be revised in order to account for the estimated propagation rate being different from the assumed propagation rate on which the trip plan is based. As a result, flow of the method 500 may proceed to 528.

At 528, one or more remedial actions are performed in response to the estimated propagation rate being different from the assumed propagation rate. In response to the determination that the estimated propagation rate being different from the assumed propagation rate, the vehicle system may prohibit the braking advisement notification from being provided to the operator. The vehicle system may no longer provide such a notification because the propagation rate that actually can be provided by the vehicle system may be less than the assumed propagation rate on which the notification is based. Consequently, the notification may erroneously be based on an assumption that the vehicle system can provide the braking effort faster than the vehicle system actually can provide. Once it is determined that the vehicle system cannot provide the assumed propagation rate, the vehicle system may stop providing such notifications. Optionally, the vehicle system can continue to provide the notifications, but provide the notifications based on the estimated propagation rate sooner than the notifications based on the assumed propagation rate.

In one aspect, the notification is no longer provided to the operator if the estimated propagation rate results in the vehicle system having an acceleration that is greater than the acceleration of the vehicle system if the vehicle system were able to provide the assumed propagation rate. For example, if the acceleration of the vehicle system using the estimated propagation rate would result in the vehicle system traveling at least $X_1$ kilometers per hour (at t seconds after activation of the braking system) faster than the vehicle system would travel if the assumed braking effort were provided. The term $X_1$ can represent a first designated speed and the term t can represent a designated amount of time.

Optionally, if the vehicle system is traveling according to a trip plan that was created or previously revised based on the assumed propagation rate, the trip plan may be revised using the estimated propagation rate as a remedial action. For example, if the vehicle system is not able to provide the braking effort at the assumed propagation rate, the designated operational settings of the trip plan may be changed to account for the different estimated propagation rate that the vehicle system actually can provide. This revising of the trip plan may include directing the vehicle system to activate the braking effort sooner than in the trip plan prior to revision, to travel slower during approaches to locations where the braking system is to be activated (relative to the trip plan prior to revision), and the like.

As one example, the trip plan is revised if the acceleration of the vehicle system using the estimated propagation rate would result in the vehicle system traveling at least $X_2$ kilometers per hour (at t seconds after activation of the braking system) faster than the vehicle system would travel if the assumed braking effort were provided. The term $X_2$ can represent a second designated speed that is faster than the term $X_1$ in the example described above.

In one aspect, the remedial action may be notifying the operator that the estimated propagation rate differs from the assumed propagation rate. For example, a display device may present a visual warning, a speaker device may audibly present a warning, and/or a haptic device may present a warning by vibrating and/or changing a temperature of a device (e.g., a seat, handle, or the like) to warn the operator that the estimated propagation rate differs from the assumed propagation rate.

Optionally, the remedial action may be communicating a notification of the estimated propagation rate being different from the assumed propagation rate to one or more off-board locations. As one example, this notification may be transmitted or broadcast to a repair facility (e.g., building) located at an upcoming portion of the route. The notification may be provided so that the repair facility can prepare for the arrival of the vehicle system, such as by scheduling time to inspect and/or repair the braking system, to order parts for the braking system, to arrange for one or more specialized repair persons to travel to the repair facility, or the like.

As another example, the notification can be communicated to a scheduling facility, such as a dispatch center, that coordinates the schedules and/or movements of several vehicle systems on a network of interconnected routes. The notification may be provided to allow for the scheduling facility to determine if the schedules of one or more of the vehicle systems need to be changed to account for the estimated propagation rate of the vehicle system. For example, the scheduling facility may direct other vehicle systems to remain farther from the vehicle system having a slower estimated propagation rate to prevent the vehicle systems from coming too close to the vehicle system having the decreased estimated propagation rate and risk collision.

Figure 9:
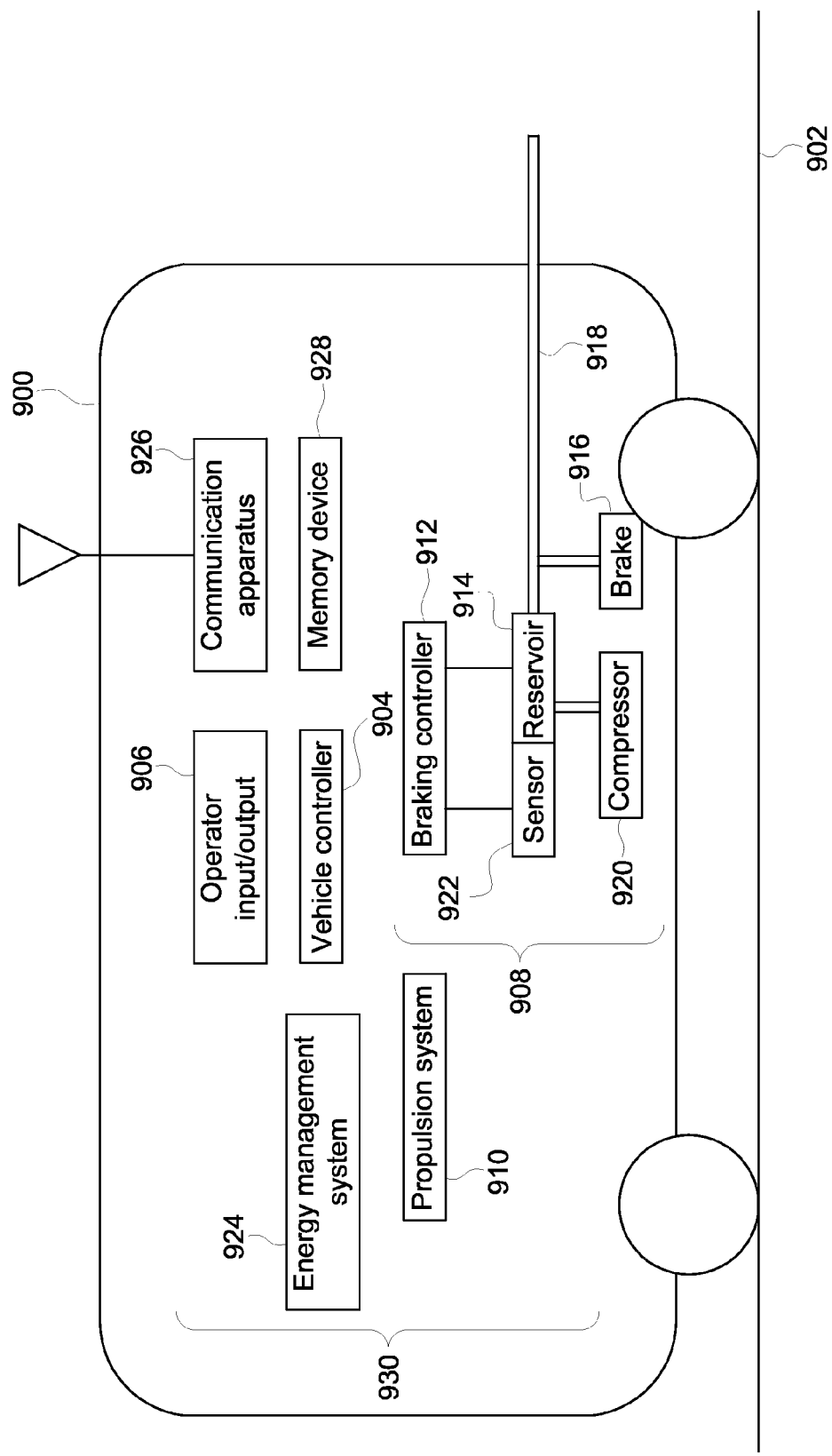
FIG. 9 is a schematic illustration of an embodiment of a vehicle system.

FIG. 9 is a schematic illustration of an embodiment of a vehicle system 900. The vehicle system 900 may represent a propulsion-generating vehicle that is capable of generating tractive effort to propel the vehicle system 900 along a route 902. For example, the vehicle system 900 may represent a rail vehicle (e.g., a locomotive), another off-highway vehicle (e.g., a vehicle that is not designed or permitted for travel on public roadways), an automobile, or another type of vehicle. Optionally, the vehicle system 900 may represent multiple vehicles mechanically connected together. For example, the vehicle system 900 may include the vehicle shown in FIG. 9 coupled with one or more other propulsion-generating vehicles and/or one or more non-propulsion-generating vehicles (e.g., railcars) for traveling together along the route 902.

The vehicle system 900 includes a control system 930 formed from several components described below that may be coupled with each other by one or more wired and/or wireless connections (not shown), such as wireless networks, conductive paths, and the like. The components may include or represent one or more processors, controllers, or other logic based devices (and/or associated hardware, circuitry, and/or software stored on a tangible and non-transitory computer readable medium or memory). The components shown in FIG. 9 may represent the hardware that operates based on software or hardwired instructions, the software that directs hardware to perform the operations, or a combination thereof. One or more of the components shown in FIG. 9 may be disposed off-board the vehicle system 900. One or more of the components shown in FIG. 9 may be used to perform the operations described in connection with the methods described above.

A vehicle controller 904 of the control system 930 controls operations of the vehicle system 900. The vehicle controller 904 may communicate with one or more operator input and/or output devices 906 ("Operator Input/Output" in FIG. 9) in order to communicate with an operator of the vehicle system 900. The vehicle controller 904 may receive manually input commands to control the tractive efforts and/or braking efforts generated by a respective one of a propulsion system 910 and a braking system 908 of the vehicle system 900. The operator input/output device 906 may provide the notifications regarding the estimated braking effort being different from an assumed braking effort and/or the estimated propagation rate being different from an assumed propagation rate to the operator.

The vehicle controller 904 may perform one or more operations described in connection with the methods 100 and/or 500. For example, the vehicle controller 904 may monitor the fluid pressures of the braking system, identify the brake events, identify time periods of interest, calculate residual forces, calculate differences in residual forces, determined modeled braking efforts, estimate braking efforts, estimate propagation rates, or the like.

The propulsion system 910 represents one or more engines, motors, alternators, generators, batteries, brakes, and the like, that generate the tractive efforts and/or some braking efforts of the vehicle system 900 as commanded and controlled by the vehicle controller 904. The operator input/output device 906 can include a throttle that is manually manipulated by the operator to change between different throttle settings to vary the amount of tractive effort, power output, or the like, generated by the propulsion system 910. With respect to braking efforts, the propulsion system 910 may control braking efforts provided by motors of the vehicle system 900, such as by controlling dynamic braking efforts generated by traction motors of the vehicle system 900.

The braking system 908 represents one or more components that generate braking efforts to slow or stop movement of the vehicle system 900. In the illustrated example, the braking system 908 includes a braking controller 912 that controls when the braking system 908 is activated to slow or stop movement of the vehicle system 900. The braking controller 912 may be manually controlled by the operator input/output device 906 and/or automatically controlled by the vehicle controller 904.

The braking system 908 includes a fluid reservoir 914 that is fluidly coupled with one or more brakes 916 by one or more conduits 918. The fluid reservoir 914 may be coupled with one or more additional brakes disposed onboard another vehicle (e.g., where the vehicle system 900 includes multiple mechanically coupled vehicles) by the conduits 918. The braking system 908 may be activated by the braking controller 912 causing the fluid stored in the reservoir 914 to be released from the reservoir 914 and the conduits 918. The release of this fluid causes the fluid pressure that was built up in the reservoir 914 and/or conduits 918 to decrease. The decrease in fluid pressure prevents the brakes 916 from remaining disengaged from the moving components (e.g., wheels, axles, or the like) of the vehicle system 900. As a result, the brakes 916 engage these moving components and slow or stop movement of the vehicle system 900. In order to release the brakes 916, a compressor, pump, or other device that acts to increase the fluid pressure in the reservoir 914 and/or conduits 918 (e.g., "Compressor 920" in FIG. 9) pumps fluid into the reservoir 914 and/or conduits 918. As the fluid pressure increases in the reservoir 914 and/or conduits 918, the brakes 916 may be separated from the moving components of the vehicle system 900, which releases the brakes 916 from slowing or stopping movement of the vehicle system 900.

The braking system 908 includes a sensor 922 that measures pressures in the reservoir 914 and/or conduits 918. For example, the sensor 922 may be a pressure sensor that outputs an electric signal representative of the fluid pressure that is measured. The sensor 922 may output this signal to the braking controller 912 and/or the vehicle controller 904.

The vehicle controller 904 may automatically control the tractive efforts (e.g., throttle settings) and/or brake settings of the propulsion system 910 and/or braking system 908. For example, the vehicle controller 904 may control the throttle and/or brake settings of the vehicle system 900 according to designated operational settings of a trip plan for the vehicle system 100. The trip plan may be generated and/or modified by an off-board source (e.g., a dispatch center that communicates the trip plan to the vehicle system 900) or by an onboard energy management system 924. Optionally, the energy management system 924 may be located off-board of the vehicle system 900. The energy management system 924 may include or represent one or more processors, controllers, or other logic based devices (and/or associated hardware, circuitry, and/or software stored on a tangible and non-transitory computer readable medium or memory) that create and/or modify trip plans for the vehicle system 900.

The trip plan may be based on a variety of relevant information, such as the size (e.g., length and/or weight) of the vehicle system 900, the distribution of size (e.g., the distribution of weight) throughout the vehicle system 900, the contents of the vehicle system 900 (e.g., the number, type, capabilities, locations, and the like, of the propulsion-generating vehicles in the vehicle system 900), the terrain (e.g., grades, curvatures, locations of tunnels, locations of slow orders, speed limits, and the like) over which the vehicle system 900 is to travel for the trip, the schedule by which the vehicle system 900 is to travel according to for the trip, weather conditions, types of fuel being used, emissions restrictions on travel of the vehicle system 900, and/or other factors. In one aspect, the trip plan is based on an assumed braking effort of the braking system 908 and/or an assumed propagation rate of the braking system 908.

The trip plan created and/or modified by the energy management system 924 designates operational settings of the vehicle system 900 for a trip. These operational settings may be designated as a function of time and/or distance along the route 902 for the trip to one or more locations (e.g., one or more intermediate or final locations). By way of example only, the operational settings that may be designated include, but are not limited to, speeds, accelerations, power outputs, throttle settings, brake settings, applications of rail lubricants, forces exerted on coupling mechanisms that connect the illustrated vehicle with one or more additional vehicles in the vehicle system 900, or the like.

An example trip plan may designate throttle settings, speeds, power outputs, brake settings, or the like, to reduce at least one of fuel consumed and/or emissions generated by the vehicle system 900 relative to the vehicle system 900 being operated according to another trip plan or in another manner. For example, operating the vehicle system 900 according to the trip plan may cause the vehicle system 900 to consume less fuel and/or generate fewer emissions than the same vehicle system 900 traveling over the same route 902 to the same destination location at the same time, but at one or more different speeds (such as by traveling at the speed limits or track speeds of the route 902).

The vehicle controller 904 may automatically control throttle and/or brake settings of the vehicle system 100 in an attempt to match the actual operations (e.g., speed, power output, and the like) with the designated operational settings of the trip plan. Optionally, the energy management system 924 and/or the vehicle controller 904 may instruct the operator how to manually control operations of the vehicle system 900 according to the trip plan. For example, the energy management system 924 and/or the vehicle controller 904 may visually, audibly, and/or tactilely present instructions to an operator on how to control the vehicle system 900 according to the trip plan via the operator input/output device 906 (e.g., display screens; touchscreens; speakers; tactically actuated levers, buttons, switches, and the like).

A communication apparatus 926 of the vehicle system 900 communicates with other vehicles and/or other remote locations that are off-board the vehicle system 900. The communication apparatus 926 may include or represent an antenna (along with associated transceiver hardware circuitry and/or software applications) for wirelessly communicating with other vehicles and/or remote locations. Optionally, the communication apparatus 926 may communicate via one or more wired connections, such as a multiple unit (MU) cable, a trainline, an electrically controlled pneumatic (ECP) brake line, and the like.

The communication apparatus 926 may receive information used in conjunction with operation of the methods 100 and/or 500 from one or more off-board locations. For example, the communication apparatus 926 may receive grades of the route 902, assumed braking efforts, assumed propagation rates, trip plans, or the like, from an off-board location. Optionally, this information may be input by an operator via the operator input/output device 906, such as by entering the information from a manifest of the vehicle system 900.

The communication apparatus 926 may communicate (e.g., broadcast or transmit) information regarding the estimated braking efforts and/or estimated propagation rates of the vehicle system 900. For example, the communication apparatus 926 may notify an off-board location of the estimated braking efforts being less than the assumed braking efforts and/or the estimated propagation rate being slower than the assumed propagation rate, as described above.

The vehicle system 900 includes a memory device 928 that may include or represent one or more memories (e.g., a tangible and non-transitory computer readable memory, such as a computer hard drive, EEPROM, ROM, RAM, or the like) having a table, list, database, or other memory structure used to store information used in conjunction with performing one or more of the methods 100 and/or 500. For example, the vehicle controller 904 may monitor the operational settings of the vehicle system 900 and/or the fluid pressures of the braking system 908 and at least temporarily store these settings and pressures in the memory device 928. The memory device 928 may store information used to create and/or revise the trip plan, and/or may store information used to calculate the residual forces of the vehicle system 900 (e.g., the mass of the vehicle system 900, the grade of the route 902, and the like). The vehicle controller 904 can store information on the memory device 928, such as the calculated residual efforts, the time periods of interest, the times at which brake events occur, the line that is fit to the residual forces in the propagation window to estimate the propagation rate of the braking system 908, the times at which the pre- and post-brake event time periods occur, and the like.

In an embodiment, a method (e.g., for monitoring a braking system of a vehicle system) includes monitoring fluid pressures of a braking system and modeled braking efforts of the braking system in a vehicle system traveling along a route, identifying one or more time periods at least one of before a brake event of the braking system or after the brake event, calculating residual forces exerted on the vehicle system during the one or more time periods, and determining at least one of an estimated braking effort of the braking system or an estimated propagation rate at which the estimated braking effort is applied by the braking system using the residual forces that are calculated.

In one aspect, the estimated braking effort is determined by calculating a difference between the residual forces calculated for a first time period of the one or more time periods that occurs before the brake event and the residual forces calculated for a second time period of the one or more time periods that occurs after the brake event.

In one aspect, the estimated propagation rate is determined by calculating a rate at which the residual forces change within a designated propagation window time period following the brake event.

In one aspect, the one or more time periods are steady state time periods identified by determining when the fluid pressures do not change by more than a first designated threshold amount for at least a designated time period and when the modeled braking efforts also do not change by more than a second designated threshold amount for at least the same designated time period.

In one aspect, the brake event represents activation of the braking system by changing the fluid pressures of fluid stored in a reservoir of the braking system.

In one aspect, the estimated propagation rate is determined only when at least one of a throttle setting or a brake setting of the vehicle system does not change during a designated, non-zero propagation window time period following the brake event.

In one aspect, the estimated propagation rate is determined even if at least one of a throttle setting or a brake setting of the vehicle system changes during a designated, non-zero propagation window time period following the brake event.

In one aspect, the method also includes revising a trip plan of a trip of the vehicle system along the route responsive to at least one of the estimated braking effort deviating from an assumed braking effort by at least a first threshold amount or the estimated propagation rate deviating from an assumed propagation rate by at least a second threshold amount. The trip plan designates operational settings of the vehicle system as a function of at least one of time or distance along the route. The trip plan is created using at least one of the assumed braking effort or the assumed propagation rate.

In an embodiment, a control system (e.g., of a vehicle system) includes a vehicle controller configured to monitor fluid pressures of a braking system and modeled braking efforts of the braking system in a vehicle system traveling along a route. The vehicle controller also is configured to identify one or more time periods at least one of before a brake event of the braking system or after the brake event. The vehicle controller is further configured to calculate residual forces exerted on the vehicle system during the one or more time periods and determine at least one of an estimated braking effort of the braking system or an estimated propagation rate at which the estimated braking effort is applied by the braking system using the residual forces that are calculated.

In one aspect, the vehicle controller is configured to determine the estimated braking effort by calculating a difference between the residual forces calculated for a first time period of the one or more time periods that occurs before the brake event and the residual forces calculated for a second time period of the one or more time periods that occurs after the brake event.

In one aspect, the vehicle controller is configured to determine the estimated propagation rate by calculating a rate at which the residual forces change within a designated propagation window time period following the brake event.

In one aspect, the vehicle controller is configured to identify the one or more time periods by determining when the fluid pressures do not change by more than a first designated threshold amount for at least a designated time period and when the modeled braking efforts also do not change by more than a second designated threshold amount for at least the same designated time period.

In one aspect, the brake event represents activation of the braking system by changing the fluid pressures of fluid stored in a reservoir of the braking system.

In one aspect, the vehicle controller is configured to determine the estimated propagation rate only when at least one of a throttle setting or a brake setting of the vehicle system does not change during a designated, non-zero propagation window time period following the brake event.

In one aspect, the control system also includes an energy management system configured to revise a trip plan of a trip of the vehicle system along a route responsive to at least one of the estimated braking effort deviating from an assumed braking effort by at least a first threshold amount or the estimated propagation rate deviating from an assumed propagation rate by at least a second threshold amount. The trip plan designates operational settings of the vehicle system as a function of at least one of time or distance along a route being traveled by the vehicle system (or to be traveled by the vehicle system). The trip plan is created using at least one of the assumed braking effort or the assumed propagation rate.

In an embodiment, a method (e.g., for monitoring a braking system) includes measuring air pressures of an air braking system of a vehicle system before and after a brake event representing activation of the air braking system, modeling braking efforts provided by the air braking system before and after the brake event, identifying a pre-brake event time period when both the air pressures do not vary by more than a first threshold amount and the braking efforts that are modeled do not vary by more than a second threshold amount, calculating pre-brake event residual forces exerted on the vehicle system during the pre-brake event time period, and estimating at least one of an actual braking effort of the air braking system or a propagation rate at which the actual braking effort is applied by the air braking system using the residual forces that are calculated.

In one aspect, the method also includes identifying a post-brake event time period when both the air pressures do not vary by more than the first threshold amount and the braking efforts that are modeled do not vary by more than the second threshold amount, and calculating post-brake event residual forces exerted on the vehicle system during the post-brake event time period, wherein the actual braking effort is estimated by calculating a difference between the pre-brake event residual forces and the post-brake event residual forces.

In one aspect, the method also includes identifying a post-brake event propagation window following the brake event, calculating propagation window residual forces occurring during the post-brake event propagation window, and identifying a rate of change in a difference between the propagation window residual forces and the pre-brake event residual forces as the estimated propagation rate.

In one aspect, the method also includes notifying an operator of the vehicle system to not activate the braking system responsive to at least one of the estimated braking effort being less than an assumed braking effort or the estimated propagation rate being slower than an assumed braking rate.

In one aspect, the method also includes revising a trip plan of a trip of the vehicle system along the route responsive to at least one of the estimated braking effort being less than an assumed braking effort by at least a threshold amount or the estimated propagation rate being slower than an assumed propagation rate by at least a threshold rate. The trip plan designates operational settings of the vehicle system as a function of at least one of time or distance along the route and is created using at least one of the assumed braking effort or the assumed propagation rate.

In one aspect, the braking efforts that are modeled represent forces that are expected to be provided by the braking system based on one or more input values representative of characteristics of at least one of the vehicle system or the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:

monitoring fluid pressures of a braking system with one or more pressure sensors and modeled braking efforts of the braking system in a vehicle system traveling along a route, the modeled braking efforts representing one or more calculated values of a braking force expected to be provided by the braking system based on one or more measured parameters of the vehicle system, wherein the modeled braking efforts may be different from a braking force that is generated by the braking system;

identifying, with one or more processors, one or more time periods before a brake event of the braking system and one or more time periods after the brake event;

calculating, with the one or more processors, residual forces exerted on the vehicle system during at least one of the one or more time periods before the brake event or the one or more time periods after the brake event, the residual forces including one or more forces exerted on the vehicle system other than the braking force generated by the braking system;

determining, with the one or more processors, at least one of an estimated braking effort of the braking system or an estimated propagation rate at which the estimated braking effort changes using the residual forces that are calculated; and responsive to determining the at least one of the estimated braking effort or the estimated propagation rate, one or more of:

changing a time at which a braking notification is provided to an operator of the vehicle system to instruct the operator to engage the braking system, revising a trip plan of the vehicle system using the at least one of the estimated braking effort or the estimated propagation rate, wherein the trip plan designates operational settings of the vehicle system as a function of one or more of time or distance along the route, notifying the operator of the vehicle system that the at least one of the estimated braking effort or the estimated propagation rate differs from at least one of the braking force that is expected to be provided by the braking system or a propagation rate that is expected to be provided by the braking system, or notifying an off-board location that the at least one of the estimated braking effort or the estimated propagation rate differs from the at least one of the braking force that is expected to be provided by the braking system or the propagation rate that is expected to be provided by the braking system.

2. The method of claim 1, wherein the estimated braking effort is determined by calculating a difference between the residual forces calculated for a first time period of the one or more time periods that occurs before the brake event and the residual forces calculated for a second time period of the one or more time periods that occurs after the brake event.

3. The method of claim 1, wherein the estimated propagation rate is determined by calculating a rate at which the residual forces change within a designated propagation window time period following the brake event.

4. The method of claim 1, wherein the one or more time periods before the brake event and the one or more time periods after the brake event are steady state time periods identified by determining when the fluid pressures do not change by more than a first designated threshold amount for at least a designated time period and when the modeled braking efforts also do not change by more than a second designated threshold amount for at least the same designated time period.

5. The method of claim 1, wherein the brake event represents activation of the braking system by changing the fluid pressures of fluid stored in a reservoir of the braking system.

6. The method of claim 1, wherein the estimated propagation rate is determined only when at least one of a throttle setting or a brake setting of the vehicle system does not change during a designated, non-zero propagation window time period following the brake event.

7. The method of claim 1, wherein the estimated propagation rate is determined even if at least one of a throttle setting or a brake setting of the vehicle system changes during a designated, non-zero propagation window time period following the brake event.

8. The method of claim 1, further comprising revising the trip plan of the vehicle system responsive to at least one of the estimated braking effort deviating from the braking force that is expected to be provided by the braking system by at least a first threshold amount or the estimated propagation rate deviating from the propagation rate that is expected to be provided by the braking system by at least a second threshold amount, the trip plan created using at least one of the braking force that is expected to be provided by the braking system or the propagation rate that is expected to be provided by the braking system.

9. The method of claim 1, further comprising determining the modeled braking efforts based on the one or more measured parameters that include one or more of a tractive effort generated by the vehicle system as a function of one or more of notch position of the vehicle system or velocity of the vehicle system, acceleration of the vehicle system, deceleration of the vehicle system, a mass of the vehicle system, or an adhesion between one or more wheels of the vehicle system and the route.

10. A control system comprising:

a vehicle controller configured to monitor fluid pressures of a braking system and modeled braking efforts of the braking system in a vehicle system traveling along a route, the modeled braking efforts representing one or more calculated values of a braking force expected to be provided by the braking system based on one or more measured parameters of the vehicle system, wherein the modeled braking efforts may be different from a braking force that is generated by the braking system, the vehicle controller also configured to identify one or more time periods before a brake event of the braking system and one or more time periods after the brake event, the vehicle controller further configured to calculate residual forces exerted on the vehicle system during the one or more time periods before the brake event and during the one or more time periods after the brake event and determine at least one of an estimated braking effort of the braking system or an estimated propagation rate at which the estimated braking effort changes using the residual forces that are calculated, the residual forces including one or more forces exerted on the vehicle system other than the braking force generated by the braking system.

11. The control system of claim 10, wherein the vehicle controller is configured to determine the estimated braking effort by calculating a difference between the residual forces calculated for a first time period of the one or more time periods that occurs before the brake event and the residual forces calculated for a second time period of the one or more time periods that occurs after the brake event.

12. The control system of claim 10, wherein the vehicle controller is configured to determine the estimated propagation rate by calculating a rate at which the residual forces change within a designated propagation window time period following the brake event.

13. The control system of claim 10, wherein the vehicle controller is configured to identify the one or more time periods before the brake event and the one or more time periods after the brake event by determining when the fluid pressures do not change by more than a first designated threshold amount for at least a designated time period and when the modeled braking efforts also do not change by more than a second designated threshold amount for at least the same designated time period.

14. The control system of claim 10, wherein the brake event represents activation of the braking system by changing the fluid pressures of fluid stored in a reservoir of the braking system.

15. The control system of claim 10, wherein the vehicle controller is configured to determine the estimated propagation rate only when at least one of a throttle setting or a brake setting of the vehicle system does not change during a designated, non-zero propagation window time period following the brake event.

16. The control system of claim 10, further comprising an energy management system configured to revise a trip plan of a trip of the vehicle system along the route responsive to at least one of the estimated braking effort deviating from an assumed braking effort by at least a first threshold amount or the estimated propagation rate deviating from an assumed propagation rate by at least a second threshold amount, the trip plan designating operational settings of the vehicle system as a function of at least one of time or distance along the route, the trip plan created using at least one of the assumed braking effort or the assumed propagation rate.

17. A method comprising:

measuring, with one or more pressure sensors air pressures of an air braking system of a vehicle system before and after a brake event representing activation of the air braking system;

modeling, with one or more processors, braking efforts provided by the air braking system before and after the brake event, the braking efforts that are modeled representing one or more calculated values of a braking force expected to be provided by the air braking system based on one or more measured parameters of the vehicle system, wherein the modeled braking efforts may be different from a braking force that is generated by the air braking system;

identifying, with the one or more processors, a pre-brake event time period and a post-brake event time period when both the air pressures do not vary by more than a first threshold amount and the braking efforts that are modeled do not vary by more than a second threshold amount;

calculating, with the one or more processors, pre-brake event residual forces exerted on the vehicle system during the pre-brake event time period and post-brake event residual forces exerted on the vehicle system during the post-brake event time period, the pre-brake event residual forces and the post-brake event residual forces including one or more forces exerted on the vehicle system other than the braking force generated by the braking system;

estimating, with the one or more processors, at least one of an actual braking effort of the air braking system or a propagation rate at which the actual braking effort is applied by the air braking system using one or more of the pre-brake event residual forces or the post-brake event residual forces that are calculated; and responsive to estimating the at least one of the actual braking effort or the propagation rate, one or more of:
changing a time at which a braking notification is provided to an operator of the vehicle system to instruct the operator to apply engage the air braking system, the estimated braking effort being less than an assumed braking effort or the estimated propagation rate being slower than an assumed braking rate.

18. The method of claim 17,
wherein the actual braking effort is estimated by calculating a difference between the pre-brake event residual forces and the post-brake event residual forces.

19. The method of claim 17, further comprising:
identifying a post-brake event propagation window following the brake event;
calculating propagation window residual forces occurring during the post-brake event propagation window; and
identifying a rate of change in a difference between the propagation window residual forces and the pre-brake event residual forces as the estimated propagation rate.

20. The method of claim 17, further comprising notifying an operator of the vehicle system to not activate the braking system responsive to at least one of that are calculated, the residual forces including one or more forces exerted on the vehicle system other than the braking force generated by the braking system, wherein the vehicle controller is configured to determine the estimated braking effort by calculating a difference between the residual forces calculated for a first time period of the one or more time periods that occurs before the brake event and the residual forces calculated for a second time period of the one or more time periods that occurs after the brake event.

21. The method of claim 17, further comprising revising the trip plan responsive to at least one of the estimated braking effort being less than an assumed braking effort by at least a threshold amount or the estimated propagation rate being slower than an assumed propagation rate by at least a threshold rate.

22. The method of claim 17, wherein the braking efforts that are modeled represent forces that are expected to be provided by the braking system based on one or more input values representative of characteristics of at least one of the vehicle system or a route being traveled by the vehicle system.

23. A control system comprising:
a vehicle controller configured to monitor fluid pressures of a braking system and modeled braking efforts of the braking system in a vehicle system traveling along a route, the modeled braking efforts representing one or more calculated values of a braking force expected to be provided by the braking system based on one or more measured parameters of the vehicle system, wherein the modeled braking efforts may be different from a braking force that is generated by the braking system, the vehicle controller also configured to identify one or more time periods that are one or more of before or after a brake event of the braking system, the vehicle controller further configured to calculate residual forces exerted on the vehicle system during the one or more time periods and determine at least one of an estimated braking effort of the braking system or an estimated propagation rate at which the estimated braking effort is applied by the braking system changes using the residual forces
revising a trip plan of the vehicle system using the at least one of the actual braking effort or the propagation rate that is estimated, wherein the trip plan designates operational settings of the vehicle system as a function of one or more of time or distance along the route,
notifying the operator of the vehicle system that the at least one of the actual braking effort or the propagation rate that is estimated differs from at least one of the braking force that is expected to be provided by the air braking system or a propagation rate that is expected to be provided by the air braking system, or
notifying an off-board location that the at least one of the actual braking effort or the propagation rate that is estimated differs from the at least one of the braking force that expected to be provided by the braking system or the propagation rate that is expected to be provided by the braking system.

* * * * *